US012200446B2

(12) United States Patent
Weizman et al.

(10) Patent No.: US 12,200,446 B2
(45) Date of Patent: Jan. 14, 2025

(54) EARPHONE SMARTCASE WITH AUDIO PROCESSOR

(71) Applicant: OrCam Technologies Ltd., Jerusalem (IL)

(72) Inventors: Doron Weizman, Modi'in (IL); Oren Tadmor, Mevaseret Zion (IL); Roi Nathan, Jerusalem (IL); Roy Weiss, Modi'in (IL); Tal Rosenwein, Herzliya (IL); Amnon Shashua, Mevaseret Zion (IL); Yonatan Wexler, Jerusalem (IL)

(73) Assignee: OrCam Technologies Ltd., Jerusalem (IL)

(*) Notice: Subject to any disclaimer, the term of this patent is extended or adjusted under 35 U.S.C. 154(b) by 281 days.

(21) Appl. No.: 17/942,602

(22) Filed: Sep. 12, 2022

(65) Prior Publication Data
US 2023/0083358 A1 Mar. 16, 2023

Related U.S. Application Data

(60) Provisional application No. 63/243,225, filed on Sep. 13, 2021, provisional application No. 63/389,370, filed on Jul. 15, 2022.

(51) Int. Cl.
*H04R 25/00* (2006.01)
*G06F 3/0481* (2022.01)
(Continued)

(52) U.S. Cl.
CPC ......... *H04R 25/505* (2013.01); *G06F 3/0481* (2013.01); *G06V 40/10* (2022.01);
(Continued)

(58) Field of Classification Search
CPC .... H04R 25/04; H04R 25/55; H04R 2225/55; H02J 7/0044
See application file for complete search history.

(56) References Cited

U.S. PATENT DOCUMENTS 10,506,324 B2 * 12/2019 Minoo .................. H02J 7/0044
2020/0204898 A1 * 6/2020 Schoeck ............. H04R 1/1016
(Continued)

FOREIGN PATENT DOCUMENTS

| CN | 210579152 U | * | 5/2020 | |
|---|---|---|---|---|
| CN | 114158015 A | * | 3/2022 | |
| WO | WO-2022174716 A1 | * | 8/2022 | ........... H04R 1/1033 |

*Primary Examiner* — Ryan Robinson
(74) *Attorney, Agent, or Firm* — Finnegan, Henderson, Farabow, Garrett & Dunner, LLP

(57) ABSTRACT

A system for generating processed audio signals may include an earphone comprising a microphone configured to capture sounds from an environment of the earphone, a first communication component, and a first processor; and an earphone case comprising an earphone compartment configured to receive the earphone, a second communication component, and a second processor. The first processor may be programmed to receive a captured audio signal representative of the sounds captured by the microphone; and transmit the captured audio signal via the first communication component. The second processor may be programmed to receive the captured audio signal via the second communication component; generate a processed audio signal based on analysis of the captured audio signal; and transmit the processed audio signal via the second communication component to the first communication component.

22 Claims, 20 Drawing Sheets

(51) Int. Cl.
*G06V 40/10* (2022.01)
*H04N 23/57* (2023.01)
*H04R 1/10* (2006.01)

(52) U.S. Cl.
CPC ........... *H04N 23/57* (2023.01); *H04R 1/1016* (2013.01); *H04R 1/1025* (2013.01); *H04R 1/1041* (2013.01); *H04R 25/405* (2013.01); *H04R 25/407* (2013.01); *H04R 2225/43* (2013.01); *H04R 2430/01* (2013.01)

(56) References Cited

U.S. PATENT DOCUMENTS

| | | | |
|---|---|---|---|
| 2023/0147435 A1* | 5/2023 | Yin | H04R 1/1041 381/74 |
| 2024/0064482 A1* | 2/2024 | Rau | H04R 1/1091 |
| 2024/0147129 A1* | 5/2024 | Takahashi | H04R 1/1091 |

* cited by examiner

EARPHONE SMARTCASE WITH AUDIO PROCESSOR

CROSS REFERENCES TO RELATED APPLICATIONS

This application claims the benefit of priority of U.S. Provisional Patent Application No. 63/243,225, filed on Sep. 13, 2021, and U.S. Provisional Patent Application No. 63/389,370, filed on Jul. 15, 2022. The foregoing applications are incorporated herein by reference in their entirety.

BACKGROUND

Technical Field

This disclosure generally relates to devices and methods for capturing and processing images and audio from an environment of a user, and using information derived from captured images and audio.

Background Information

Many individuals rely on technology to improve their perception of the surrounding environment. For example, hearing aids or other hearing interface devices may be used to amplify sounds in a user's environment to make them more audible to a user. While these devices may be helpful in some scenarios, uniformly amplifying all of the sound in the environment often provides limited improvement. For example, background noise and other sounds may be distracting to a user and may make certain desirable sounds (such as a voice of an individual the user is speaking with) difficult to perceive or comprehend. Therefore, many conventional hearing interface devices are incapable of adequately improving perception of individuals sounds for a user.

Further, additional functionality may also be provided to assist users in navigating in and around an environment, identifying persons and objects they encounter, and providing feedback to the users about their surroundings and activities. In some cases, the processing of audio signals, including this additional functionality, may be improved through capturing and analyzing images from the user's surroundings. While users can capture images and audio with their smartphones and some smartphone applications can process the captured information, it can often be cumbersome to rely on a smartphone for capturing audio and images as it requires additional steps by the user. Accordingly, in view of these and other deficiencies, there is a need for improved devices to provide advanced processing of audio signals, either alone or in combination with analysis of captured image data.

SUMMARY

Embodiments consistent with the present disclosure provide devices and methods for automatically capturing and processing images and audio from an environment of a user, and systems and methods for processing information related to images and audio captured from the environment of the user.

In an embodiment, a system for generating processed audio signals may comprise one or more earphones and an earphone case. At least one earphone of the one or more earphones may comprise at least one microphone configured to capture sounds from an environment of the at least one earphone; a first communication component; and at least one first processor. The at least one first processor may be programmed to receive a captured audio signal representative of the sounds captured by the at least one microphone; and transmit at least a portion of the captured audio signal via the first communication component. The earphone case may comprise at least one earphone compartment configured to receive the at least one earphone; a second communication component; and at least one second processor. The at least one second processor may be programmed to receive the at least a portion of the captured audio signal from the first communication component via the second communication component; generate a processed audio signal based on analysis of the at least a portion of captured audio signal; and transmit at least a portion of the processed audio signal via the second communication component to the first communication component.

In another embodiment, a method for generating processed audio signals is disclosed. The method may comprise receiving, using at least one first processor of the at least one earphone, a captured audio signal representative of sounds captured from an environment of the at least one earphone by at least one microphone of the at least one earphone; transmitting, using the at least one first processor, at least a portion of the captured audio signal via a first communication component of the at least one earphone; receiving, using at least one second processor of earphone case, the at least a portion of the captured audio signal from the first communication component via a second communication component of the earphone case; generating, using the at least one second processor, a processed audio signal based on analysis of the at least a portion of captured audio signal; and transmitting, using the at least one second processor, at least a portion of the processed audio signal via the second communication component to the first communication component.

In another embodiment, a system for generating processed audio signals may comprise one or more earphones and an earphone case. At least one earphone of the one or more earphones may comprise at least one microphone configured to capture sounds from an environment of the at least one earphone; a first communication component; and at least one first processor. The at least one first processor may be programmed to receive a captured audio signal representative of the sounds captured by the at least one microphone; identify at least one condition of the environment of the at least one earphone; based on the at least one condition, identify that the earphone case is required for generating a processed audio signal; determine whether the earphone case is in a functional state for generating the processed audio signal; based on a determination that the earphone case is not in the functional state, causing a notification to use the earphone case to be presented to a user of the at least one earphone; and based on a determination that the earphone case is in the functional state, transmit at least a portion of the captured audio signal via the at least one first communication component. The earphone case may comprise at least one earphone compartment configured to receive the at least one earphone; a second communication component; and at least one second processor. The at least one second processor may be programmed to receive the at least a portion of the captured audio signal from the first communication component via the second communication component; generate a processed audio signal based on analysis of the at least a portion of captured audio signal; and transmit at least a portion of the processed audio signal via the second communication component to the first communication component.

In another embodiment, a method for generating processed audio signals is disclosed. The method may comprise receiving a captured audio signal representative of sounds captured from an environment of the at least one earphone by at least one microphone of the at least one earphone; identifying at least one condition of the environment of the at least one earphone; based on the at least one condition, identify that the earphone case is required for generating a processed audio signal; determining whether the earphone case is in a functional state for generating the processed audio signal; based on a determination that the earphone case is not in the functional state, causing a notification to use the earphone case to be presented to a user of the at least one earphone; and based on a determination that the earphone is in the functional state, transmitting at least a portion of the captured audio signal via the at least one first communication component to at least one second communication component of an earphone case. The earphone case may be configured to: receive the at least a portion of the captured audio signal from the first communication component via a second communication component of the earphone case; generate a processed audio signal based on analysis of the at least a portion of captured audio signal; and transmit at least a portion of the processed audio signal via the second communication component to the first communication component.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
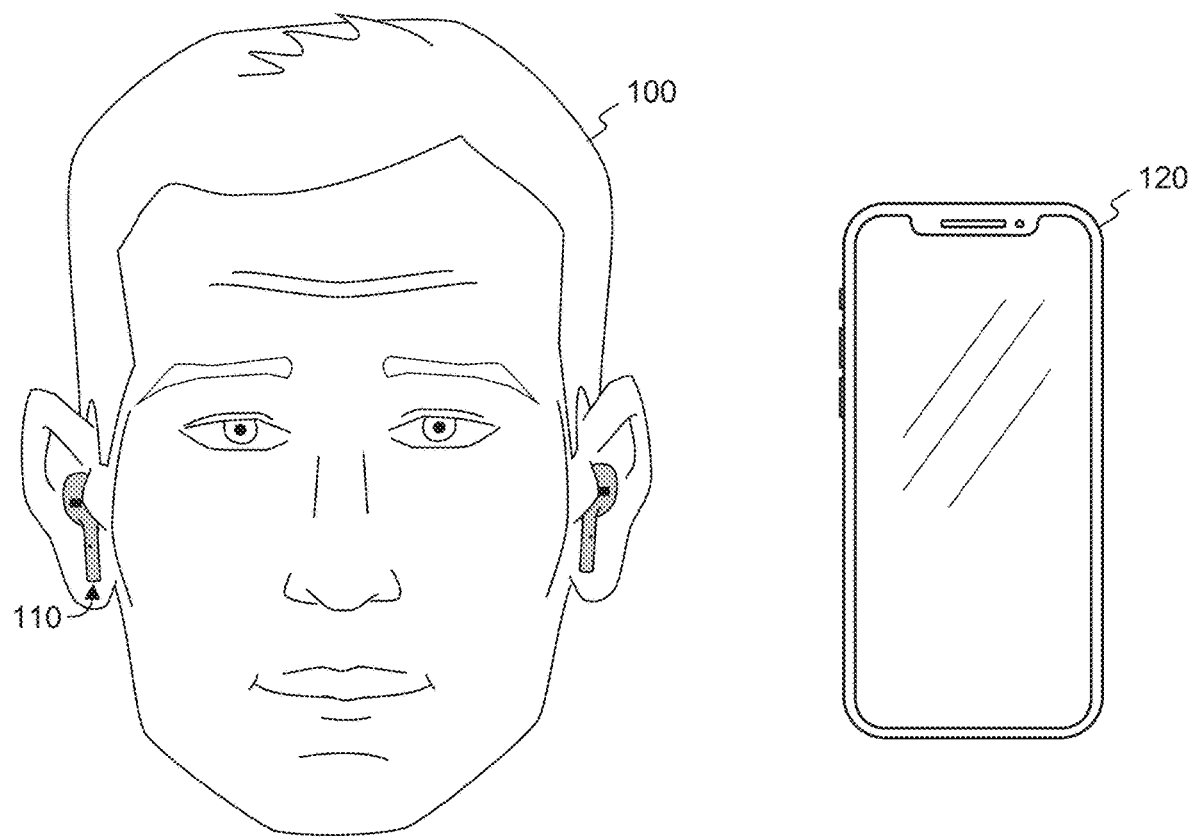
FIG. 1 is an illustration of an example of a user wearing an earphone, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 illustrates a user 100 wearing a pair of earphones 110. As shown, an earphone 110 may be worn in the ear of user 100. For example, earphone 110 may include a speaker device (not shown in FIG. 1) configured to deliver audio to the ear of user 100. Earphone 110 may include a microphone or other audio sensors for capturing audio signals from the environment of user 100. These audio signals may be analyzed, conditioned, and/or otherwise processed and provided to the ear of user 100. Accordingly, earphone 110 may provide an improved hearing experience for user 100, by providing processed audio signals to user 100, which may be easier for user 100 to understand. In some embodiments, earphone 110 may provide notifications, alerts, or other information to user 100, as described further herein.

In some embodiments, earphone 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1 as an external device, in some embodiments, computing device 120 may be provided as part of earphone 110. In some embodiments, computing device 120 may be included in an augmented reality display device or optical head mounted display. In other embodiments, computing device 120 may be provided as part of another wearable or portable earphone of user 100 including a wrist-strap, a multifunctional watch, a button, a clip-on, etc. In yet other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 2:
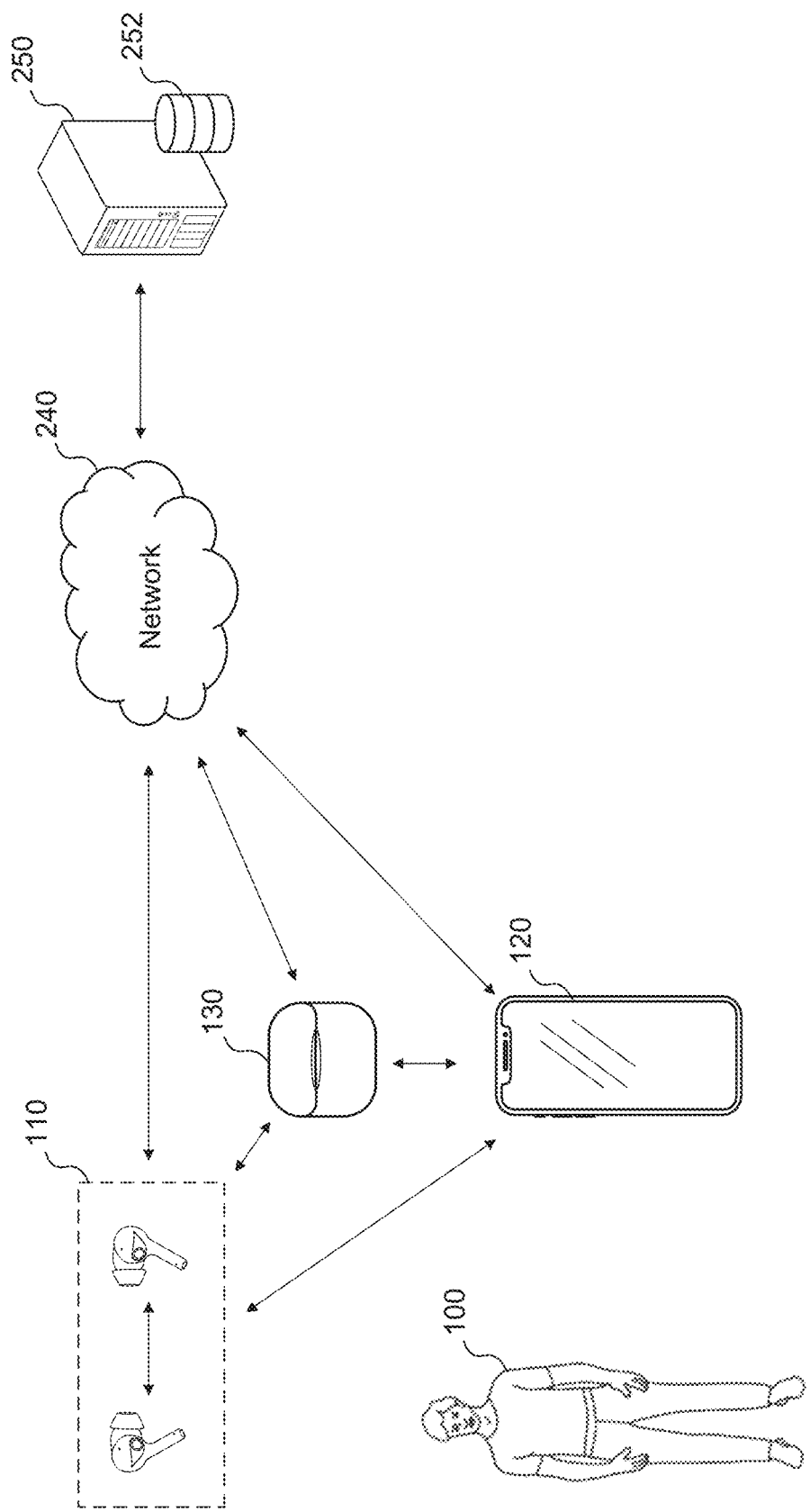
FIG. 2 is a schematic illustration of an example system consistent with the disclosed embodiments.

FIG. 2 is a schematic illustration of an exemplary system 200 including an earphone 110 (or multiple earphones 110), worn by user 100, and an optional computing device 120 and/or a server 250 capable of communicating with earphone 110 via a network 240, consistent with disclosed embodiments. In some embodiments, earphone 110 may capture and analyze audio and image data, as described in further detail below. Earphone 110 may generate a processed audio signal to present to the ear of user 100 based at least in part on the analysis of the audio and image data. In some embodiments, earphone 110 may perform various other actions, which may include providing feedback or other information to a user 100 based on the analysis of the audio and image data. In some embodiments, optional computing device 120 and/or server 250 may provide additional functionality to enhance interactions of user 100 with his or her environment, as described in greater detail below.

In some embodiments, earphone 110 may be associated with an earphone case 130, which may be configured to contain one or more earphone 110. Earphone case 130 may perform additional functions, such as providing a charge to earphone 110. In some embodiments, earphone case 130 may perform various processing functions for audio and/or image data, which may be captured using earphone 110. Alternatively or additionally, earphone case 130 may capture its own audio and/or image data, as described in further detail below.

As indicated in FIG. 2, the various components of system 200 may communicate either through direct communications, or over a network 240. Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between earphone 110 and computing device 120 provided in close proximity to each other, such as on or near a user's person, for example. Earphone 110 may establish a connection to network 240 autonomously, for example, using a wireless module (e.g., Wi-Fi, cellular). In some embodiments, earphone 110 may use the wireless module when being connected to an external power source, to prolong battery life. Further, communication between earphone 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, earphone 110 may transfer or receive data to/from server 250 via network 240. In the disclosed embodiments, the data being received from server 250 and/or computing device 120 may include numerous different types of information based on image data captured by earphone 110 or computing device 120, and analysis thereof, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to earphone 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3:
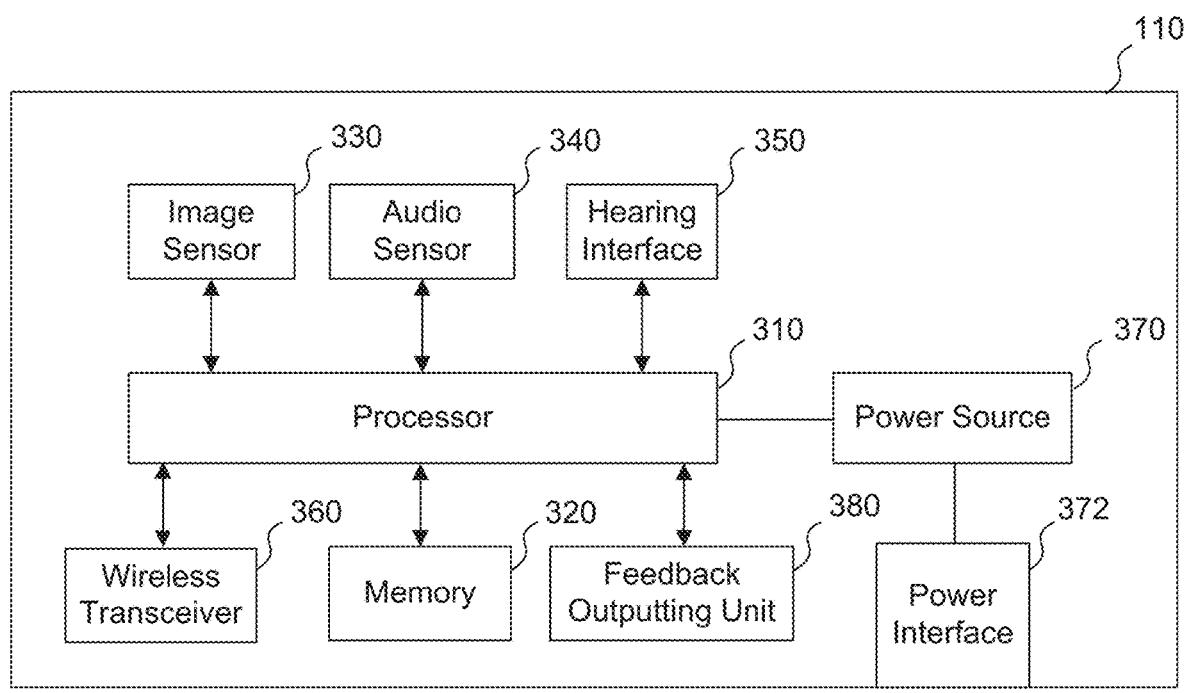
FIG. 3 is a block diagram illustrating components of an example hearing interface device, consistent with the disclosed embodiments.

FIG. 3 is a block diagram illustrating the components of earphone 110 according to an example embodiment. As shown in FIG. 3, earphone 110 may include a processor 310, an audio sensor 340, an image sensor 330, a wireless transceiver 360, a hearing interface 350, a memory 320, a power source 370, and a power interface 372. Earphone 110 is not limited to the components shown in FIG. 3 and may include other of fewer components depending on the application. For example, in some embodiments earphone 110 may also include buttons, other sensors such as a proximity sensor or similar sensors, and inertial measurements devices such as accelerometers, gyroscopes, magnetometers, temperature sensors, color sensors, light sensors, etc. Earphone 110 may further include a data port with suitable interfaces for connecting with an external device (not shown). In some embodiments, earphone 110 may not include an image sensor and/or an audio sensor.

Processor 310, depicted in FIG. 3, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. Processor 310 may be configured to generate a processed audio signal based on analysis of a captured audio signal or audio signal received from another source, or a captured image, as described throughout the present disclosure. For example, this may include executing instructions stored in memory 320 to perform selective conditioning of audio signals, analyze lip movements or other gestures and/or voice signatures, or various other analyses described above with respect to processor 110. The instructions executed by the processing device may, for example, be pre-loaded into a memory integrated with or embedded into the processing device or may be stored in a separate memory (e.g., memory 320).

In the embodiment illustrated in FIG. 3, earphone 110 includes one processing device (e.g., processor 310). However, in some embodiments, earphone 110 may include more than one processing device. Each processing device may have a similar construction, or the processing devices may be of differing constructions that are electrically coupled, connected, or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

Memory 320 may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments memory 320 may store audio data or image data (e.g., images, videos) captured from the environment of user 100. In addition, memory 320 may store information specific to user 100, such as voice signatures, also referred to as voice prints of one or more individuals, image representations of known individuals, favorite products, personal items, and calendar or appointment information, etc. In some embodiments, processor 310 may determine, for example, which type of voice data or image data to store based on available storage space in memory 320. In another embodiment, processor 310 may extract information from the image data stored in memory 320.

As discussed above, earphone 110 may include an image sensor 330 for capturing image data. The term "image sensor" refers to a device capable of detecting and converting optical signals in the near-infrared, infrared, visible, and ultraviolet spectrums into electrical signals. The electrical signals may be used to form an image or a video stream (i.e., image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 330 may be part of a camera included in earphone 110. In some cases, image sensor 330 may be part of a camera included in the same housing as earphone 110. Although image sensor 330 is described generally herein as optic camera, it is to be understood that image sensor 330 is not limited to this form of capturing device, and any sensor that outputs information about the structure or appearance of the environment may be used, such a video camera, a still camera, a wide angle camera, a narrow angle camera, a thermal camera, a radar device, a Simultaneous Localization and Mapping (SLAM) device, or various other forms of sensors. In some embodiments, the camera may be a black and white camera, which may have advantages such as a better signal-to-noise (SNR) ratio, a better resolution, a simpler lens or other components, or the like.

In some embodiments, processor 310 may control image sensor 330 to capture image data and for analyzing the image data according to the disclosed embodiments. As discussed above, processor 310 may perform logic operations on one or more inputs of image data and other data according to stored or accessible software instructions providing desired functionality. In some embodiments, processor 310 may also control feedback outputting unit 380 to provide feedback to user 100 including information based on the analyzed image data and the stored software instructions.

In another embodiment, processor 310 may change the aiming direction of image sensor 330. For example, in some embodiments, the aiming direction of image sensor 330 may not coincide with the field-of-view of user 100. Processor 310 may recognize certain situations from the analyzed image data and adjust the aiming direction of image sensor 330 to capture relevant image data. For example, in one embodiment, processor 310 may detect an interaction with another individual and sense that the individual is not fully in view, because image sensor 330 is tilted down. Responsive thereto, processor 310 may adjust the aiming direction of image sensor 330 to capture image data of the individual. Other scenarios are also contemplated where processor 310 may recognize the need to adjust an aiming direction of image sensor 330.

In some embodiments, processor 310 may communicate data to feedback-outputting unit 380, which may include any device configured to provide information to a user 100. Feedback outputting unit 380 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 380 of some embodiments may additionally or alternatively produce a visible output of information to user 100, for example, through a display 450 provided as part of computing device 120, which may include an onboard automobile heads up display, an augmented reality device, a virtual reality device, a smartphone, PC, table, etc. Feedback outputting unit 380 may be provided as part of earphone 110 (as shown) or may be provided external to earphone 110 and communicatively coupled thereto. Feedback-outputting unit 380 may be configured to output visual or nonvisual feedback based on signals received from processor 310, such as when processor 310 recognizes a hand-related trigger or other events or objects in the analyzed image data.

The term "feedback" refers to any output or information provided in response to processing at least one image in an environment. In some embodiments, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. Accordingly, processor 310 may be configured to detect any of these various elements within the environment of user 100. In some embodiments, feedback may include an audible tone, a tactile response, and/or information previously recorded by user 100. Feedback-outputting unit 380 may comprise appropriate components for outputting acoustical and tactile feedback. For example, feedback-outputting unit 380 may correspond to hearing interface 350 and may provide audible feedback to the ear of user 100. In some embodiments, processor 310 may communicate signals with an external feedback outputting unit 380 via a wireless transceiver 360, a wired connection, or some other communication interface. In some embodiments, feedback outputting unit 380 may also include any suitable display device for visually displaying information to user 100.

As further shown in FIG. 3, earphone 110 may include a power source 370. The term "power source" includes any device capable of providing electrical power, which can be contained within earphone 110 or easily carried by hand (e.g., power source 370 may weigh less than a pound). The mobility of the power source enables user 100 to use earphone 110 in a variety of situations. In some embodiments, power source 370 may include one or more batteries (e.g., nickel-cadmium batteries, nickel-metal hydride batteries, and lithium-ion batteries) or any other type of electrical power supply. In other embodiments, power source 370 may be rechargeable and contained within the earphone and/or within a casing that holds earphone 110. In yet other embodiments, power source 370 may include one or more energy harvesting devices for converting ambient energy into electrical energy (e.g., portable solar power units, human vibration units, etc.). Power source 370 may be configured to receive a charge through power interface 372. For example, power interface 372 may include one or more conductive pins or other conductive elements configured to receive energy from an external power source, which may be provided to and retained in power source 370.

Earphone 110 may further include wireless transceiver 360, as shown in FIG. 3. The term "wireless transceiver" refers to any device configured to exchange transmissions over an air interface by use of radio frequency, infrared frequency, magnetic field, or electric field. Wireless transceiver 360 may use any known standard to transmit and/or receive data (e.g., Wi-Fi, Bluetooth®, Bluetooth Smart, 802.15.4, or ZigBee). For example, wireless transceiver 360 may be used for short-range communication with one or more of an additional earphone 110, computing device 120, earphone case 130, or various other devices. In some embodiments, wireless transceiver 360 may communicate over a network, such as network 240. In some embodiments, wireless transceiver 360 may transmit data (e.g., raw image data, processed image data, extracted information) from earphone 110 to server 250, earphone case 130, and/or computing device 120. Wireless transceiver 360 may further be configured to receive data from server 250, earphone case 130, and/or computing device 120. For example, this may include receiving instructions or requests to perform operations (e.g., capture an image, transmit data, etc.), data used for analysis (e.g., models used to process audio signals, voice signature data, facial feature data, etc.), update information (e.g., software updates, firmware updates, etc.), or any other data that may be relevant to processing audio signals using earphone 110.

In some embodiments, earphone 110 may include various controls for adjusting operation of earphone 110. For example, this may include one or more buttons, switches, dials, sensors, touch areas, or other components that may trigger or allow for parameters of earphone 110 to be modified. In some embodiments, earphone 110 may be equipped with a switch for turning image sensor 1410 on or off, for entering a battery-saving mode, or the like. Earphone 110 may include various other controls, for example, for changing an audio sampling rate, an image capture rate, a part of a field of view of image sensor 330 that is captured, or the like.

As will be appreciated by a person skilled in the art having the benefit of this disclosure, numerous variations and/or modifications may be made to the disclosed embodiments. Not all components are essential for the operation of earphone 110. Any component may be located in any appropriate apparatus and the components may be rearranged into a variety of configurations while providing the functionality of the disclosed embodiments. For example, in some embodiments, earphone 110 may include a camera, a processor, and a wireless transceiver for sending data to another device. Therefore, the foregoing configurations are examples and, regardless of the configurations discussed above, earphone 110 can capture, store, and/or process images.

Figure 4:
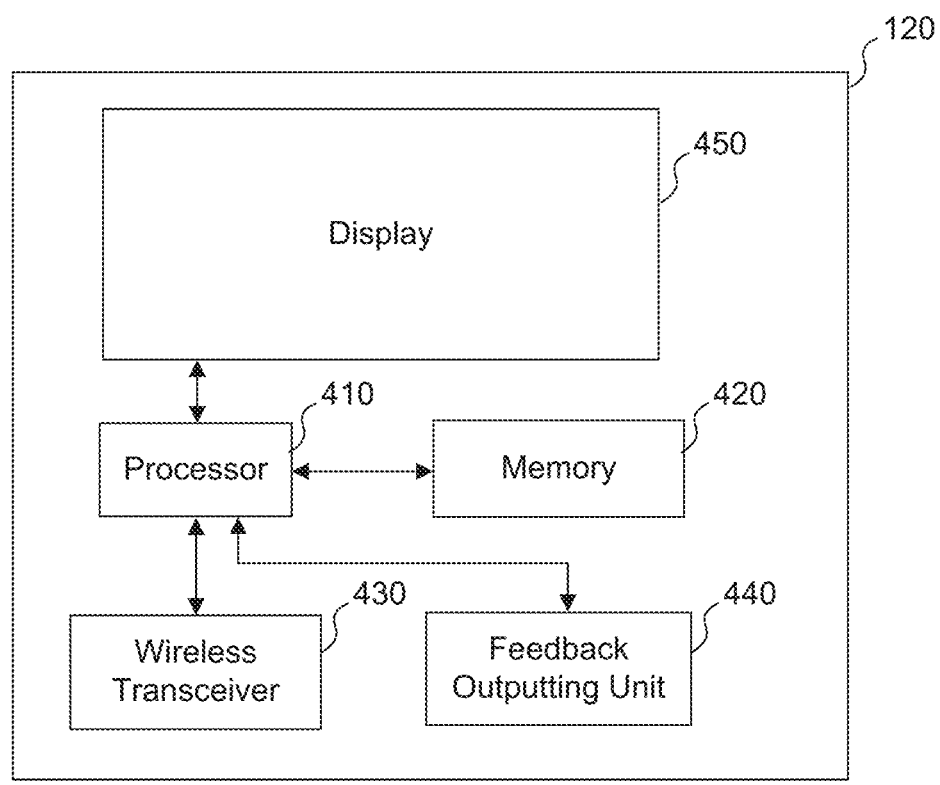
FIG. 4 is a block diagram illustrating components of an example computing device, consistent with the disclosed embodiments.

FIG. 4 is a block diagram illustrating the components of an example computing device 120. Computing device 120 may include a processor 410, a feedback-outputting unit 440, a memory 420, a wireless transceiver 430, and a display 450. Examples of computing device 120 include a smartphone, a smartwatch, or a tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of vocal trigger, a hand-related trigger on display 450 or an action performed using computing device 120. Additionally, user 100 may view other data (e.g., images, video clips, object information, schedule information, extracted information, etc.) on display 450. In addition, user 100 may communicate with server 250 via computing device 120.

The term "computing device" refers to a device including a processing unit and having computing capabilities. Some examples of computing device 120 include a PC, laptop, tablet, or other computing systems such as an on-board computing system of an automobile, for example, each configured to communicate directly with earphone 110 or server 250 over network 240. Another example of computing device 120 includes a smartphone having a display 450. In some embodiments, computing device 120 may be a computing system configured particularly for earphone 110, and may be provided integral to earphone 110 or tethered thereto. Earphone 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, a smartwatch, or a tablet, computing device 120 may have a dedicated application installed therein. For example, user 100 may view on display 450 data (e.g., images, video clips, extracted information, feedback information, etc.) that originate from or are triggered by earphone 110. In addition, user 100 may select part of the data for storage in server 250.

In some embodiments, processor 310 may identify environmental information in the captured and analyzed audio and/or images, such as an individual standing in front user 100 or a known individual speaking, and send computing device 120 information related to the analyzed information such as the name of the individual and the last time user 100 met the individual. In a different embodiment, processor 410 may extract statistical information from captured image data and forward the statistical information to server 250. For example, certain information regarding the types of items a user purchases, or the frequency a user patronizes a particular merchant, etc. may be determined by processor 410. Based on this information, server 250 may send computing device 120 coupons and discounts associated with the user's preferences.

When earphone 110 is connected or wirelessly connected to computing device 120, earphone 110 may transmit at least part of the image data stored in memory 320 for storage in memory 420. In some embodiments, after computing device 120 confirms that transferring the part of image data was successful, processor 410 may delete the part of the image data. The term "delete" means that the image is marked as 'deleted' and other image data may be stored instead of it, but does not necessarily mean that the image data was physically removed from the memory.

Figure 5:
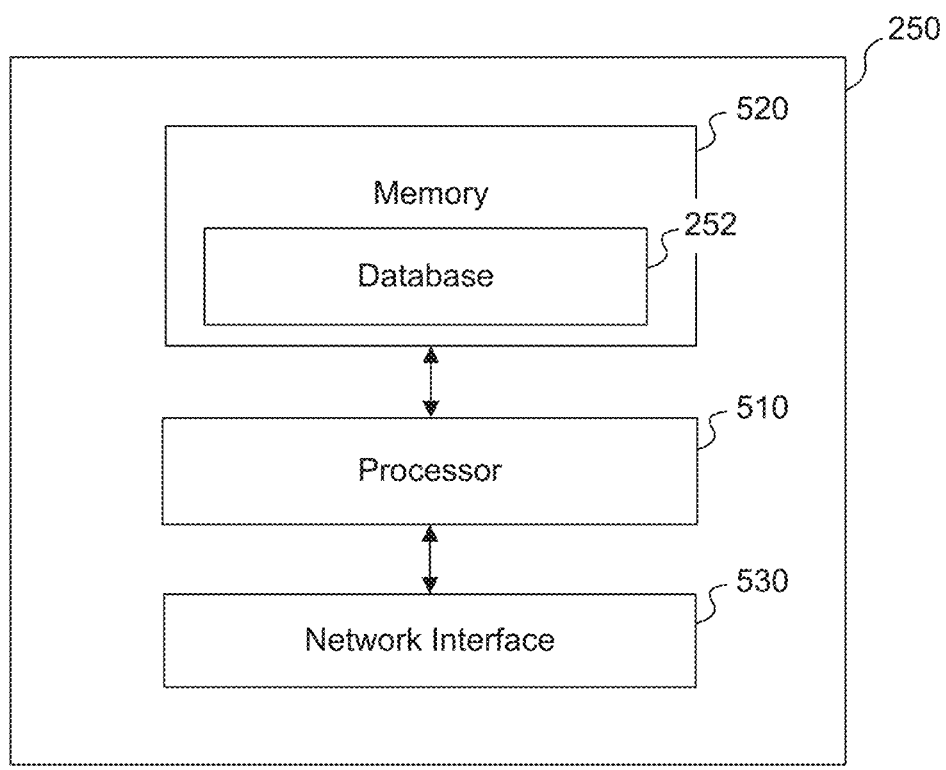
FIG. 5 is a block diagram illustrating components of an example server, consistent with the disclosed embodiments.

FIG. 5 is a block diagram illustrating an example of server 250, consistent with embodiments of the present disclosure. As described above, server 250 may be a computing device and may include one or more dedicated processors and/or memories. For example, server 250 may include at least one processor, more generally referred to as processor 510, a memory (or multiple memories) 520, a network interface (or multiple network interfaces) 530, as shown in FIG. 5. In some embodiments, server 250 may be a rack of multiple servers. Accordingly, server 250 may include multiple instances of the example server shown in FIG. 5.

Processor 510 may take the form of, but is not limited to, a microprocessor, embedded processor, or the like, may be integrated in a system on a chip (SoC), or more take the form of any processor described earlier. Furthermore, according to some embodiments, the processor 510 may be from the family of processors manufactured by Intel®, AMD®, Qualcomm®, Apple®, NVIDIA®, or the like. Processor 510 may also be based on an ARM architecture, a mobile processor, or a graphics processing unit, etc. The disclosed embodiments are not limited to any type of processor included in server• 250. In some embodiments, processor 510 may refer to multiple processors.

Memory 520 may include one or more storage devices configured to store instructions used by the processor 510 to perform functions related to the disclosed embodiments. Memory 520 may be configured to store software instructions, such as programs, that perform one or more operations when executed by the processor 510 to perform the various functions or methods described herein. The disclosed embodiments are not limited to particular software programs or devices configured to perform dedicated tasks. For example, memory 520 may store a single program, such as a user-level application, that performs the functions of the disclosed embodiments, or may include multiple software programs. Additionally, the processor 510 may in some embodiments execute one or more programs (or portions thereof) remotely located from server•. Furthermore, the memory 520 may include one or more storage devices configured to store data for use by the programs. In some embodiments, memory 520 may include a local database 252. In some embodiments, memory 520 and/or database 252 may store information associated with user 100. For example, server 250 may maintain a database of acquaintances or contacts of user 100, associated images or data used to recognize individuals, audio clips or voiceprints used to recognize individuals, or the like.

Network interface 530 may include one or more network adaptors or communication devices and/or interfaces (e.g., WiFi®, Bluetooth®, RFID, NFC, RF, infrared, Ethernet, etc.) to communicate with other machines and devices, such as with other components of system 200 through network 240. For example, server 250 may use a network interface 530 to receive and transmit information associated with captured and/or processed audio signals within system 200.

Earphone and Camera Integration

As described herein, the disclosed embodiments may include selectively conditioning an audio signal to separate speakers, remove background noise or other sounds, and transmit speech or other desired sounds to a hearing interface device. In some embodiments, the various components for capturing information from the environment of the user, analyzing and processing the information, and presenting the processed audio to a user may be contained within a single housing. As people now tend to wear earphones frequently, wearing this single earphone may provide significant functionality as described above, without attracting undesired attention. Further, in some embodiments, a user may wear an earphone in each ear to improve perception of the environment of the user and the processing and presentation of audio signals. For example, multiple earphones may allow for better spatial tracking of audio sources, simultaneous processing functions, or various other techniques described below.

Figure 6A:
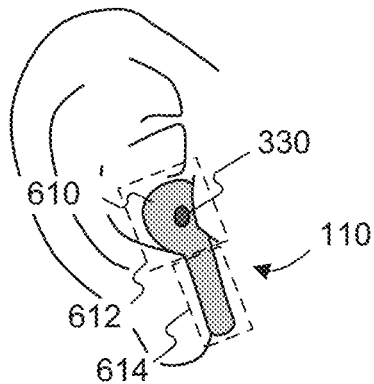
FIGS. 6A, 6B, 6C, and 6D illustrate example configurations of a hearing interface device, consistent with the disclosed embodiments.
Figure 6B:
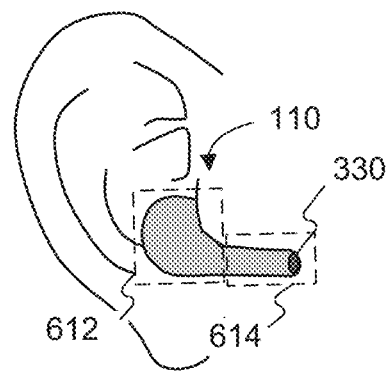

FIGS. 6A, 6B, 6C, and 6D illustrate example configurations of earphone 110, consistent with the disclosed embodiments. In FIGS. 6A and 6B, earphone 110 is shown inserted into an ear of a user. As shown in FIG. 6A, earphone 110 may include a housing 610 configured to house or contain the various components of earphone 110 described above. Housing 610 may be at least partially insertable into an ear of a user such that hearing interface 350 may deliver sounds to the user. Housing 610 may be a rigid or semi-rigid component and may be constructed of any suitable material, such as silicone, rubber, plastic, metal, wood, or the like. In some embodiments, earphone 110 may include a head part 612 and a neck part 614, as shown in FIG. 6A. In this example, earphone 110 may be used by inserting the head part 612 (which may include hearing interface 350) into the ear, such that neck part 614 points downward. Image sensor 330 may be installed in earphone 110 and, in particular, in the head part 614 and may face forward such that a line of sight of image sensor 330 is substantially parallel to the line of sight of a user wearing earphone 110. FIG. 6B shows another example embodiment of earphone 110, consistent with the disclosed embodiments. In this example, neck part 614 may point forward, and image sensor 330 may be installed at the end of neck part 614 such that a line of sight of image sensor 330 is again substantially parallel to the line of sight of the user. Thus, in both examples above, earphone 110 includes a housing 610, at least part of which may be insertable into an ear of a user.

Figure 6C:
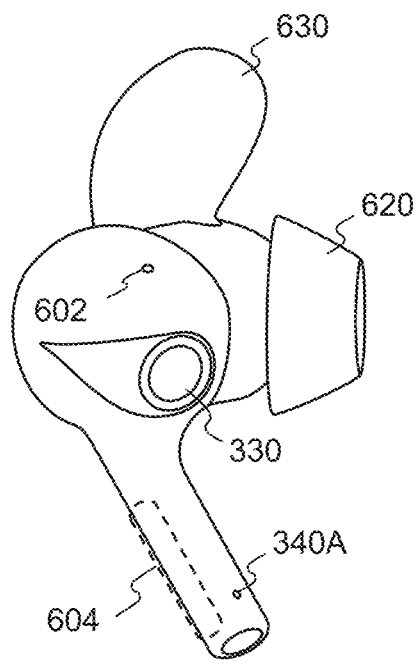
Figure 6D:
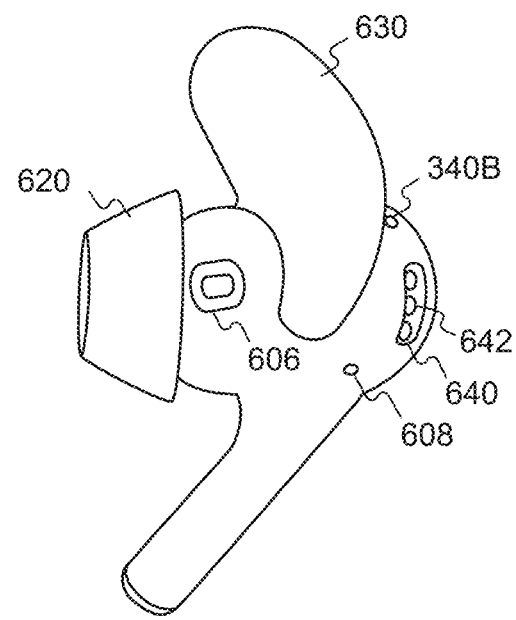

FIGS. 6C and 6D illustrate another example configuration of hearing interface device, consistent with the disclosed embodiments. FIGS. 6C and 6D illustrate earphone 110 when it is not inserted into the ear of a user. FIG. 6D shows an alternate view of the example configuration of earphone 110 from the view shown in FIG. 6C. In this example configuration, image sensor 330 may be placed on head part 612, similar to the configuration shown in FIG. 6A. As shown in FIG. 6C, earphone 110 may include an ear tip 620 configured to be inserted into an ear of a user. Ear tip 620 may be a rubberized ear tip configured to provide better fit, additional comfort, and/or isolate background noise when inserted into the ear of the user. In some embodiments an additional microphone may be included in ear tip 620, which may be used to improve noise cancelation, determine whether earphone 110 is properly inserted, or various other applications. In some embodiments, earphone 110 may further include an acoustic vent 608, which may improve the sound quality of earphone 110 for a user. In some embodiments, earphone 110 may further include various support components or structures configured to hold earphone 110 in place when inserted into the ear of a user. For example, this may include an antihelix fastener 630. Antihelix fastener 630 may be a rubberized component configured to fit into the antihelix portion of an ear of a user when earphone 110 is inserted into the ear of the user to secure earphone 110 in place. In some embodiments, earphone 110 may include a sensor 606 to detect when earphone 110 is inserted into an ear of the user. For example, sensor 606 may include an accelerometer, a proximity sensor, a light sensor, a touch sensor, a capacitive or other electrical sensor, an ultrasonic sensor, a microphone, or any other sensor that may indicate earphone 110 has been inserted into an ear of a user.

In this example, earphone 110 may include one or more microphones. For example, earphone 110 may include a microphone 340A included on neck part 614 (shown in FIG. 6C) and an additional microphone 340B (shown in FIG. 6D). Microphones 340A and 340B may correspond to microphone 340 described above. The use of multiple microphones 340A and 340B may allow earphone 110 to capture sounds from multiple angles, which may ensure that more sounds are captured. In some embodiments, differences in sounds captured using microphones 340A and 340B may be used to ascertain information about an environment of earphone 110. For example, this may include determining a direction of an audio source relative to earphone 110 as described further herein.

In some embodiments, earphone 110 may include various other interface components, as shown in FIGS. 6C and 6D. For example, earphone 110 may include one or more buttons, dials, switches, touch areas, or pressure-sensitive areas, as described above. In some embodiments, this may include pressure-sensitive area 604, which may allow a user to provide an input to earphone 110. For example, the user may apply pressure to pressure-sensitive area 604, which may indicate that earphone 110 should change a volume level, capture an image, mute or pause audio playback, change modes (e.g., turning on or off background noise suppression, etc.), or various other commands. Earphone 110 may further include an indicator 602 (which may correspond to feedback outputting unit 380) to provide status information or other information to a user. For example, indicator 602 may be a LED or other light source, which may provide information either as a binary indicator (e.g., on and off) or based on a property, such as a color of light, a rate or pattern of blinking, a brightness, or various other properties. Indicator 602 may indicate whether earphone 110 has been inserted properly, whether a recognized individual has been detected, a battery level or status, an operating mode, or various other information. In some embodiments, earphone 110 may further include a charging port 640, which may correspond to power interface 372 described above. For example, charging port 640 may include one or more pins 642 or sockets configured to provide electrical contact with a charging device. Accordingly, charging port 640 may be used to charge a battery of earphone 110. Earphone 110 may include various other ports, such as a data port, which may provide a connection for uploading data to earphone 110 or downloading data from earphone 110. It is to be understood that the example configuration of earphone 110 shown in FIGS. 6A, 6B, 6C, and 6D are provided by way of example, and earphone 110 may include various other components.

Figure 6E:
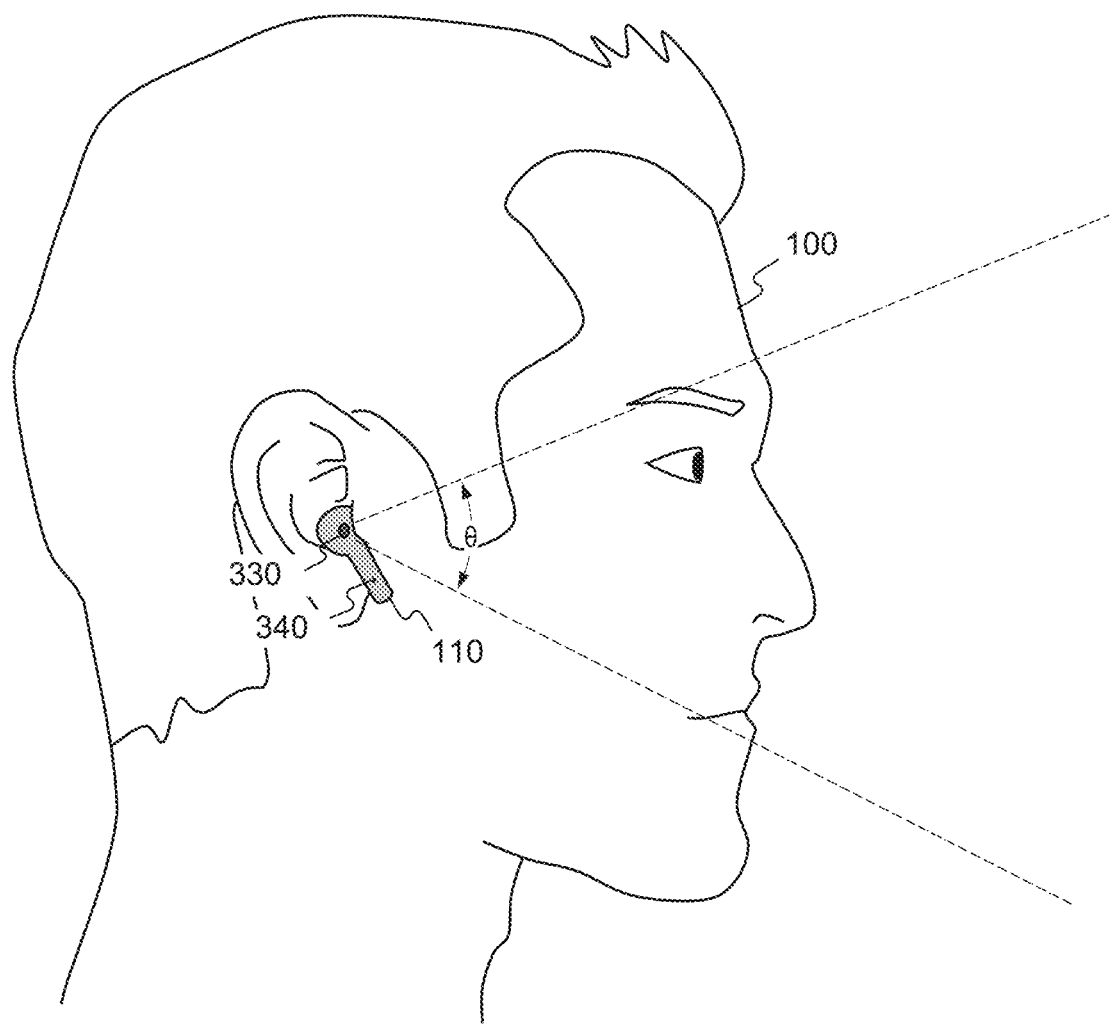
FIG. 6E illustrates an example use of a hearing interface device for capturing images from an environment of a user, consistent with the disclosed embodiments.

FIG. 6E illustrates an example use of earphone 110 for capturing images from an environment of a user 100, consistent with the disclosed embodiments. As described above, earphone 110 may be at least partially inserted into an ear of user 100. In this example, earphone 110 may be configured similar to the configuration illustrated in FIG. 6A. Accordingly, image sensor 330 may be located on a head part of earphone 110, as shown. Image sensor 330 may be configured to capture one or more images from the environment of user 100 (and earphone 110).

In this example, a line of sight of image sensor 330 may be substantially parallel to a line of sight of user 100. By being placed in a hearing interface device inserted into the ear, image sensor 330 may more accurately follow the head movements of user 100. Because image sensor 330 is placed closer to the eyes of the user as compared to a device worn on the shirt of a user or other placements, a narrower viewing angle θ of image sensor 330 may be used as compared to a viewing angle that may be required in other placement locations. For example, if an image sensor (e.g., image sensor 320) were instead worn on a chest of user 100, a relatively large viewing angle may be required to capture representations of objects viewed by user 100. In this example, viewing angle θ may range from 50° to 120° (e.g., 70°, 80°, 90°, etc.), whereas an image sensor placed on the chest of user 100 may require an angle of 130° or greater, depending on the placement. This narrow angle may enable the use of a smaller image size (e.g., a Video Graphics Array (VGA) image rather than larger image sizes of 4000×3000 pixels, etc.). This reduced image size may therefore reduce the memory requirements, processing demands, battery life, or other requirements of earphone 110.

In some embodiments, earphone 110 may be configured to cause an insertion indication to be presented to the ear of user 100 when earphone 110 is inserted into the ear of user 100. For example, this may be a tone, a chime, or another sound confirming earphone 110 has been inserted. The insertion of earphone 110 may be detected in various ways. In some embodiments, earphone 110 may include an accelerometer which may detect a motion of earphone 110. Earphone 110 may be configured to detect a motion pattern based on an output of the accelerometer, which may be compared to a stored motion pattern or motion characteristics associated with an insertion event. Based on the comparison, the insertion of earphone 110 may be detected. As another example, the insertion event may be detected based on at least one image captured by image sensor 330. For example, processor 310 may be configured to determine or estimate a height of image sensor 330 and may determine that the height is consistent with an expected height of image sensor 330 when placed in the ear of a user. As another example, processor 310 may recognize an ear, a cheek, a shoulder, or another part of user 100 within an image, which may indicate earphone 110 has been inserted.

Similarly, processor 210 may be configured to determine whether earphone 110 has been inserted correctly or incorrectly. For example, a correct insertion may be determined based on a direction or orientation of image sensor 330. If image sensor 330 is not properly aligned with a look direction of user 100 (e.g., within a threshold alignment of a preferred alignment direction), earphone 110 may be determined to be improperly inserted. In some embodiments, earphone 110 may be configured to present a different sound when earphone 110 is improperly inserted. For example, the insertion indication may be a first sound when the housing is correctly inserted into the ear of the user and a second sound when the housing is not correctly inserted into the ear of the user.

Figure 7:
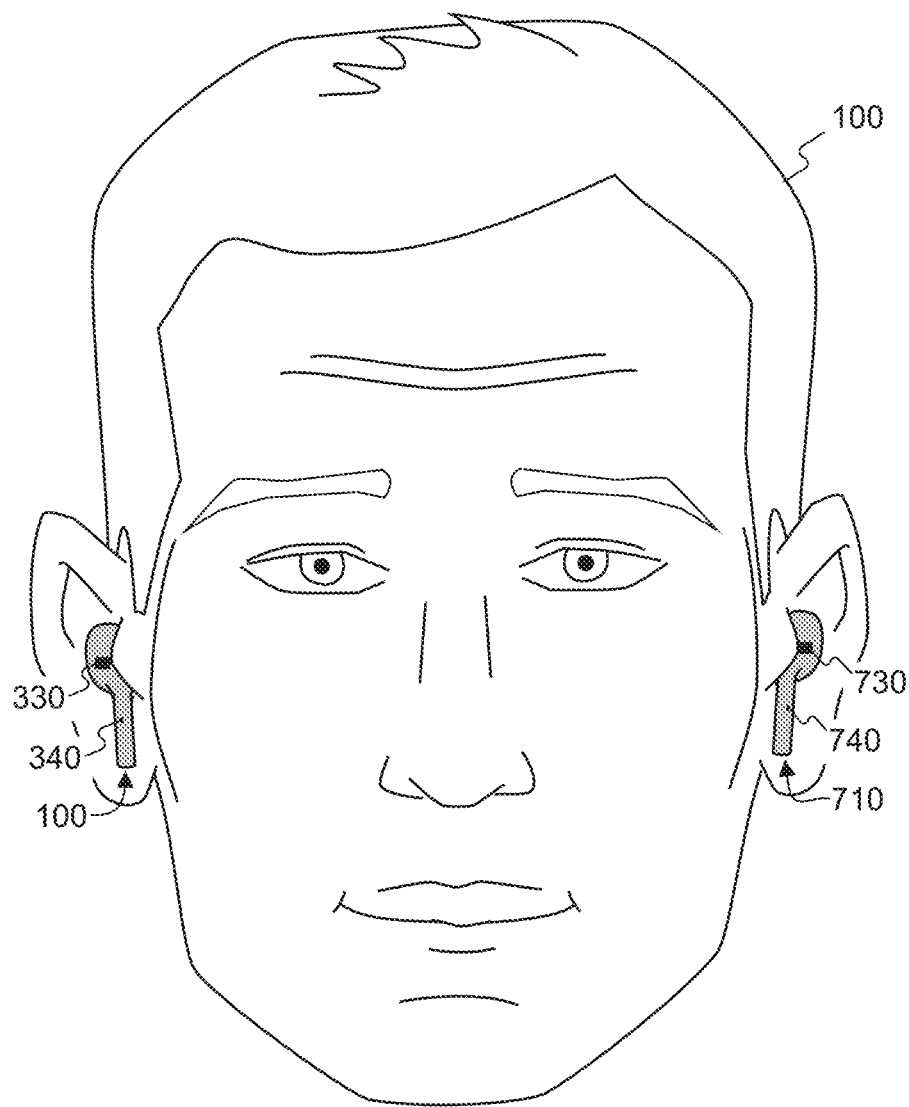
FIG. 7 illustrates an example use of multiple hearing interface devices by a user, consistent with the disclosed embodiments.

In some embodiments, user 100 may wear multiple earphones 110, for example, one in each ear. FIG. 7 illustrates an example use of multiple hearing interface devices by user 100, consistent with the disclosed embodiments. In this example, user 100 may wear earphone 110 in a first ear, as described above with respect to FIG. 6E. User 100 may also wear an additional earphone 710 in a second ear. Additional earphone 710 may be configured as a mirror image of earphone 110 such that it fits properly in the other ear of user 100. Additional earphone 710 may include an image sensor 730 and microphone 740, which may be similar to image sensor 730 and microphone 740 described above.

Earphone 110 and additional earphone 710 may be configured to share information, which may be used to process captured audio signals. For example, wireless transceiver 360 may be configured to communicate with a corresponding wireless transceiver of additional earphone 710. This may include transmitting captured images or audio signals or at least partially processed images or audio signals. In some embodiments earphone 110 and additional earphone 710 may share data derived from processing captured audio signals or images. For example, this may include voiceprints, facial features, information identifying a recognized individual, a direction of an audio source, or other information that may be derived from a captured image or audio signal. Accordingly, in some embodiments, processor 310 may generate processed audio signals based at least in part on information received from additional earphone 710. Similarly, a processor of additional earphone 710 may generate processed audio signals based at least in part on information received from earphone 110. For example, each device may perform separate processing and transmit the results to the other device. In some embodiments, the two devices may operate in a hierarchal manner. For example, earphone 110 may be a primary device and may delegate one or more operations to additional earphone 710 (or vice versa). Alternatively or additionally, earphone 110 and additional earphone 710 may operate autonomously of each other.

This shared information may allow for improved analysis of the environment of user 100. For example, as described above, a directionality of a sound may be used in selective conditioning or other forms of processing. This may include amplifying sounds received from a look direction of user 100 relative to sounds received from other directions, or other forms of direction-based sound processing. By using multiple microphones, each microphone may be used to determine a direction of an audio source, such that a more accurate combined direction of the audio source may be determined. For example, microphones 340 and 740 may be used to perform a beamforming technique or similar technique for localizing audio sources. Similarly, image data from image sensors 330 and 730 may be used to determine spatial information associated with the environment of user 100. For example, the lateral separation between image sensor 330 and image sensor 730 may provide parallax information for stereo analysis by processor 310 (and/or a processing device of additional earphone 710). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc. In some embodiments, this may include sharing data from other sensors, such as accelerometer data or the like.

The sharing of information between earphone 110 and additional earphone 710 may also allow the processing demand to be split among multiple processing devices, which may reduce the processing demand on processor 310 and thus reduce its energy consumption. This sharing may also enable tasks which otherwise cannot be performed due to insufficient processing capabilities that can be fitted into an earphone. Accordingly, various tasks or analyses described herein may be split between earphone 110 and additional earphone 710. For example, this may include splitting processing tasks based on a type of analysis. As one example, earphone 110 may be configured to process lip movements of individuals or detect facial features, as described above, whereas additional earphone 710 may be configured to determine voice prints of individuals in the environment of user 100 (which may further include recognizing one or more individuals within the environment of user 100 based on stored voice signatures). As another example, tasks may be split by objects or individuals being detected, tracked, and/or recognize. For example, earphone 110 may be configured to identify a first individual and additional earphone 710 may be configured to identify a second individual. While various distributions of tasks are provided above, it is to be understood that various other distributions of tasks may be performed. In some embodiments, the shared processing between earphone 110 and additional earphone 710 may not be split by discrete tasks and may be distributed in other ways. For example, as noted above, processor 310 may be a primary processor and may assign specific processing operations to additional earphone 710 and the result of the processing operations may be provided to processor 330.

Selective Conditioning of Audio Signals

Figure 8:
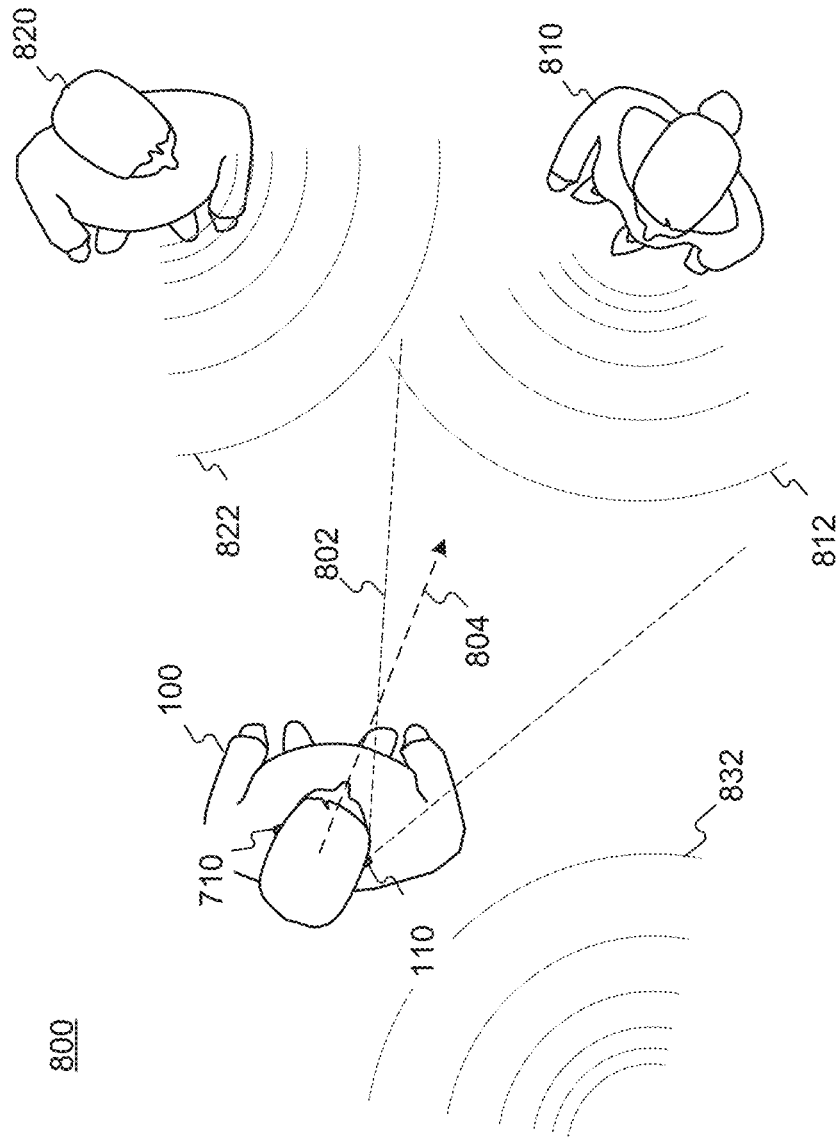
FIG. 8 illustrates an example environment of a user in which a hearing interface device may be used for generating processed audio signals, consistent with the disclosed embodiments.

In some embodiments, earphone 110 may be configured to selectively condition audio signals captured from one or more audio sources within the environment of a user. FIG. 8 illustrates an example environment 800 of user 100 in which earphone 110 may be used for generating processed audio signals, consistent with the disclosed embodiments. As noted above, processor 310 may be configured to generate one or more processed audio signals based on captured audio signals, captured images, or both. For example, environment 800 may include individuals 810 and 820, which may be the source of sounds 812 and 822, respectively. In this example, sounds 812 and 814 may be voices of individuals 810 and 820. Environment 800 may further include a sound 832, which may be a background or ambient noise from various additional sources. Microphone 340 may be configured to capture audio signals associated with sounds 812, 822, and 832. Processor 310 may be configured to selectively condition sounds 812, 822, and 832. For example, selective conditioning may include amplifying audio signals determined to correspond to sound 812 relative to other audio signals. Amplification may be accomplished digitally, for example by processing audio signals associated with sound 812 relative to other signals. Amplification may also be accomplished by changing one or more parameters of audio sensor 340 to focus on audio sounds emanating from region 802 (e.g., a region of interest) associated with user look direction 804. For example, audio sensor 340 may be a directional microphone and processor 310 may perform an operation to focus audio sensor 340 on sound 812 or other sounds within region 802. Various other techniques for amplifying sound 812 may be used, such as using a beamforming microphone array, acoustic telescope techniques, etc.

In some embodiments, selective conditioning may also include attenuation or suppressing one or more audio signals received from directions outside of region 802. For example, processor 812 may attenuate sounds 822 and 832. Similar to amplification of sound 812, attenuation of sounds may occur through processing audio signals, or by varying one or more parameters associated with one or more microphones 820 to direct focus away from sounds emanating from outside of region 802.

In some embodiments, conditioning may further include changing a tone of audio signals corresponding to sound 812 to make sound 812 more perceptible to user 100. For example, user 100 may have lesser sensitivity to tones in a certain range and conditioning of the audio signals may adjust the pitch of sound 812 to make it more perceptible to user 100. For example, user 100 may experience hearing loss in frequencies above 10 khz. Accordingly, processor 310 may remap higher frequencies (e.g., at 15 khz) to 10 khz.

In some embodiments processor 310 may be configured to change a rate of speech associated with one or more audio signals. Accordingly, processor 310 may be configured to detect speech within one or more audio signals received by audio sensor 340, for example using voice activity detection (VAD) algorithms or techniques. If sound 812 is determined to correspond to voice or speech, for example from individual 810, processor 310 may be configured to vary the playback rate of sound 812. For example, the rate of speech of individual 810 may be decreased to make the detected speech more perceptible to user 100. Various other processing may be performed, such as modifying the tone of sound 812 to maintain the same pitch as the original audio signal, or to reduce noise within the audio signal. If speech recognition has been performed on the audio signal associated with sound 812, conditioning may further include modifying the audio signal based on the detected speech. For example, processor 310 may introduce pauses or increase the duration of pauses between words and/or sentences, which may make the speech easier to understand.

The conditioned audio signal may then be transmitted to hearing interface 350 and produced for user 100. Thus, in the conditioned audio signal, sound 812 may be easier to hear to user 100, louder and/or more easily distinguishable than sounds 822 and 832, which may represent background noise within the environment.

Various techniques may be used for identifying which sounds should be amplified or attenuated relative to other sounds. For example, this may include determining a look direction 804 of user 100. Look direction 804 may be determined based on a field of view 802 of image sensor 820. Accordingly, because individual 810 is in the look direction of user 100, sound 812 may be amplified relative to one or both of sounds 822 and 832. In some embodiments, sounds may be amplified or identified based on an identification of an individual in environment 800, as described below.

In embodiments where user 100 is wearing an additional earphone 710, information from microphone 740 and/or image sensor 730 may be used to improve the analysis of environment 800. For example, a direction associated with sound 812 (or various other sounds in environment 800) may be determined based on a combined analysis of audio signals captured from microphones 340 and 740 (e.g., through beamforming or other techniques). In some embodiments, a direction associated with sound 812 may be determined separately based on microphones 340 and 740 and these directions may be combined (e.g., averaged together, etc.) to determine a more accurate direction of individual 810 relative to user 100. For example, each of microphones 340 and 740 may be a directional microphone capable of determining a directionality of sound 812. Alternatively or additionally, a direction of sound 812 may be determined based on a combined analysis of audio signals captured by microphones 340 and 740. For example, processor 310 (and/or a processor of additional earphone 710) may analyze differences in amplitude or other characteristics (e.g., timing, etc.) of sound 812 as it is represented in the respective captured audio signals. If sound 812 is represented with a slightly higher amplitude in earphone 110 than in additional earphone 710, this may indicate that sound 812 is being received from a direction slightly to the right of user 100, as shown in FIG. 8. Similarly, sound 832 may be significantly louder or clearer as captured by earphone 110 relative to additional earphone 710, which may indicate it is coming from the right of user 100. Similarly, images captured by image sensors 330 and 730 may be processed using a stereo image analysis, which may allow processor 310 to determine a depth and/or position of individuals 810 and 820 relative to user 100.

In some embodiments, earphone 110 and additional earphone 710 may be configured to synchronize with each other so that the timing at which the processed audio signal is presented to the user in each ear is consistent. For example, it may be disorienting or unpleasant to the user if a slight delay exists between the audio presented in each ear. In some embodiments, the timing between earphone 110 and additional earphone 710 may be synchronized based on a timing of sounds captured by microphones 340 and 740. As another example, the timing between earphone 110 and additional earphone 710 may be synchronized based on a timing of visual events captured by image sensors 330 and 730, such as an individual opening his mouth, clapping his hands or the like. This may provide a more accurate timing synchronization as light will be received at substantially the same time by both devices, whereas a slight delay may exist for captured audio due to differences between the speed of light and the speed of sound.

Selective Conditioning Based on Recognition of Individuals

In some embodiments, earphone 110 may selectively amplify audio signals associated with a voice of a recognized individual. The hearing aid system may store voice characteristics and/or facial features of a recognized person to aid in recognition and selective amplification. For example, when an individual enters the field of view of earphone 110, the individual may be recognized as an individual that has been introduced to the device, or that has possibly interacted with user 100 in the past (e.g., a friend, colleague, relative, prior acquaintance, etc.). Accordingly, audio signals associated with the recognized individual's voice may be isolated and/or selectively amplified relative to other sounds in the environment of the user. Audio signals associated with sounds received from directions other than the individual's direction may be suppressed, attenuated, filtered or the like.

Figure 9A:
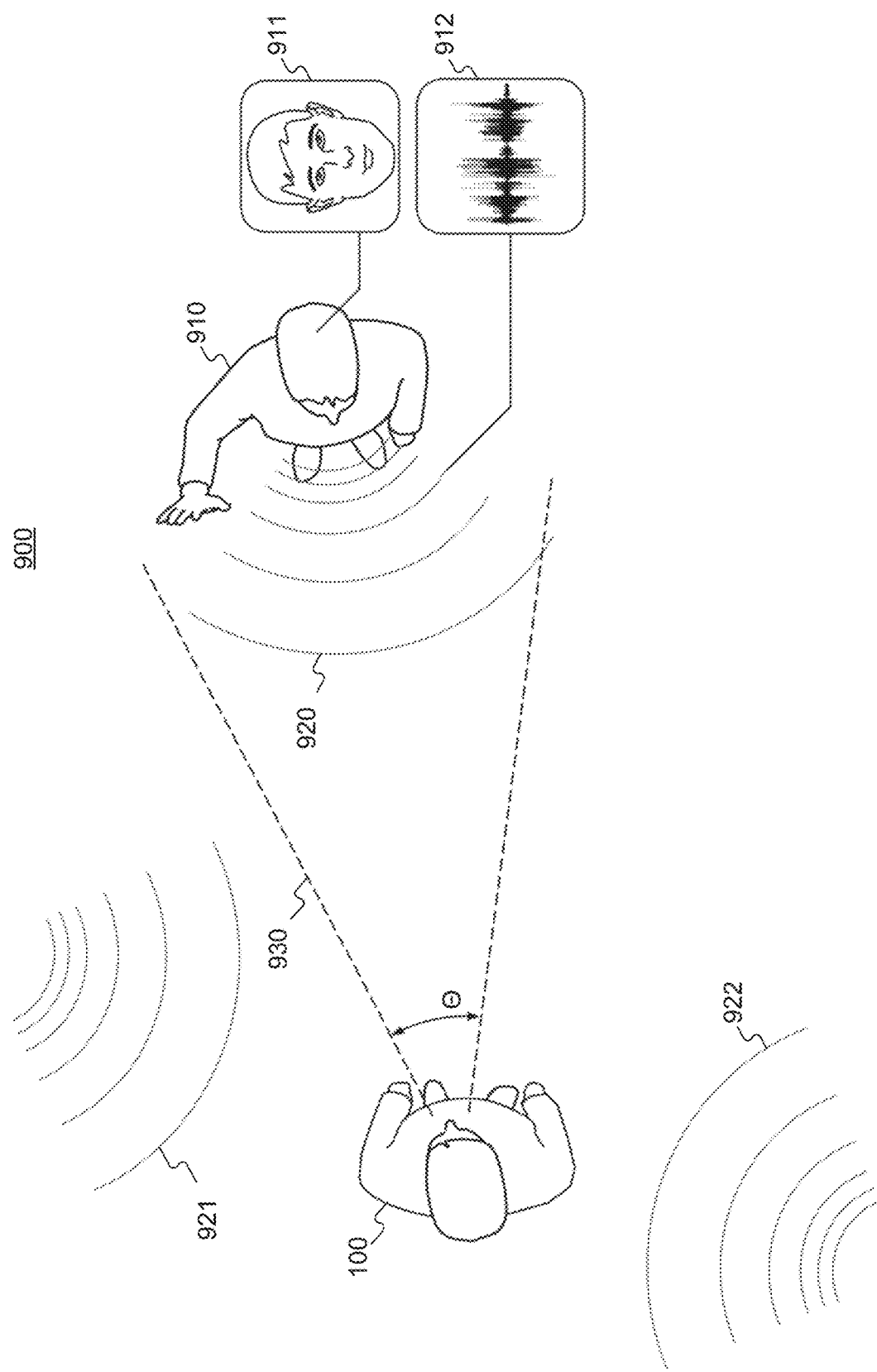
FIG. 9A is a schematic illustration showing an exemplary environment for use of a hearing aid with voice and/or image recognition consistent with the present disclosure.

Accordingly, earphone 110 may be configured to recognize an individual in the environment of user 100. FIG. 9A is a schematic illustration showing an exemplary environment 900 for selective conditioning of audio signals based on recognition of an individual, consistent with the present disclosure. Earphone 110 may be configured to recognize a face 911 or voice 912 associated with an individual 910 within the environment of user 100. For example, earphone 110 may be configured to capture one or more images of the surrounding environment of user 100 using image sensor 330. The captured images may include a representation of a recognized individual 910, which may be a friend, colleague, relative, or prior acquaintance of user 100. Processor 210 may be configured to analyze the captured images and detect the recognized user using various facial recognition techniques, as represented by element 911. Accordingly, earphone 110, or specifically memory 320, may comprise one or more facial or voice recognition components.

Accordingly, earphone 110 may be configured to identify one or more faces within the environment of user 100. For example, earphone 110 may identify facial features on the face 911 of individual 910, such as the eyes, nose, cheekbones, jaw, or other features. Earphone 110 (e.g., via processor 310) may then analyze the relative size and position of these features to identify the user. Earphone 110 may utilize one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like. Other facial recognition techniques such as 3-Dimensional recognition, skin texture analysis, and/or thermal imaging may also be used to identify individuals. Other features besides facial features may also be used for identification, such as the height, body shape, or other distinguishing features of individual 910.

Earphone 110 may access a database or data associated with user 100 to determine if the detected facial features correspond to a recognized individual. For example, a processor 310 may access a database (e.g., database 252) containing information about individuals known to user 100 and data representing associated facial features or other identifying features. Such data may include one or more images of the individuals, or data representative of a face of the user that may be used for identification through facial recognition. Database 252 may be any device capable of storing information about one or more individuals, and may include a hard drive, a solid state drive, a web storage platform, a remote server, or the like. Database 252 may be located within earphone 110 (e.g., within memory 320) or external to earphone 110 (e.g., at case 130, server 250 as shown in FIG. 2). In some embodiments, database 252 may be associated with a social network platform, such as Facebook™, LinkedIn™, Instagram™, etc. Earphone 110 may also access a contact list of user 100, such as a contact list on the user's phone, a web-based contact list (e.g., through Outlook™, Skype™, Google™, SalesForce™, etc.) or a dedicated contact list associated with hearing interface device 810. In some embodiments, database 252 may be compiled by earphone 110 through previous facial recognition analysis. For example, processor 310 may be configured to store data associated with one or more faces recognized in images captured by earphone 110 in database 252. Each time a face is detected in the images, the detected facial features or other data may be compared to previously identified faces in database 252. Earphone 110 may determine that an individual is a recognized individual of user 100 if the individual has previously been recognized by the system in a number of instances exceeding a certain threshold, if the individual has been explicitly introduced to earphone 110, or the like.

In some embodiments, processor 310 may use various techniques to recognize the voice of individual 910, as described in further detail below. The recognized voice pattern and the detected facial features may be used, either alone or in combination, to determine that individual 910 is recognized by earphone 110. Processor 310 may also determine a user look direction 804, as described above, which may be used to verify the identity of individual 910. For example, if user 100 is looking in the direction of individual 910 (especially for a prolonged period), this may indicate that individual 910 is recognized by user 100, which may be used to increase the confidence of earphone 110 or other identification means.

Processor 310 may further be configured to determine whether individual 910 is recognized by user 100 based on one or more detected audio characteristics of sounds associated with a voice of individual 910. Returning to FIG. 9A, processor 310 may determine that sound 920 corresponds to voice 912 of individual 910. Processor 310 may analyze audio signals representative of sound 920 captured by audio sensor 340 (which may correspond to audio sensor 560) to determine whether individual 910 is recognized by user 100. This may be performed using one or more voice recognition algorithms, such as Hidden Markov Models, Dynamic Time Warping, neural networks, or other techniques. Processor 310 may access database 252, which may further include a voiceprint of one or more individuals. Processor 310 may analyze the audio signal representative of sound 920 to determine whether voice 912 matches a voiceprint of an individual in database 252. Accordingly, database 252 may contain voiceprint data associated with a number of individuals, similar to the stored facial identification data described above. After determining a match, individual 910 may be determined to be a recognized individual of user 100. This process may be used alone, or in conjunction with the facial recognition techniques described above. For example, individual 910 may be recognized using image-based recognition and may be verified using voice recognition, or vice versa.

Figure 9B:
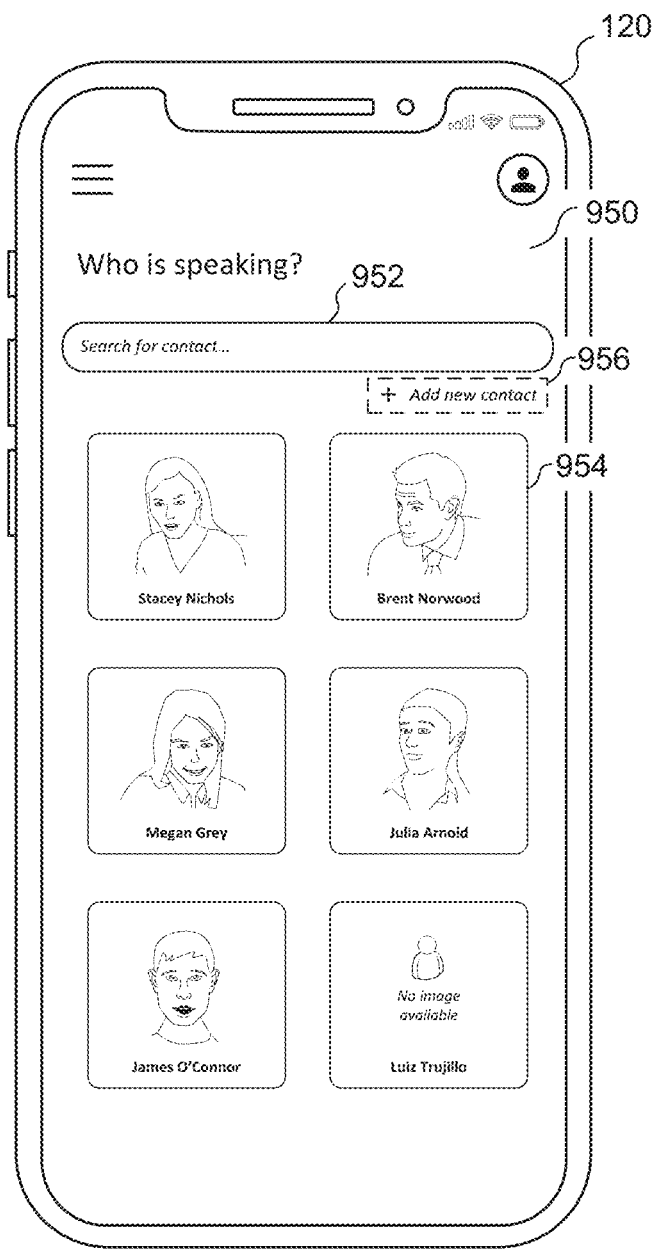
FIG. 9B is an illustration showing an exemplary user interface for identifying an individual consistent with the present disclosure.

In some embodiments, an individual may be recognized at least in part using an input from user 100. For example, user 100 may provide a user input through computing device 120, which may be used to select and/or identify an individual (or confirm an identity of the individual) alone or on combination with the voice- or image-based recognition described above. FIG. 9B illustrates an example user interface 950 that may be used to receive an input identifying an individual, consistent with the disclosed embodiments. In some embodiments, user interface 950 may be displayed on a device accessible to user 100, such display 450 of computing device 120. In some embodiments, user interface 950 may be displayed automatically. For example, system 200 may detect that an individual is speaking and may prompt user 100 to identify the individual through user interface 950. In some embodiments, this may be based on a determination that the individual is unrecognized or that the individual is recognized with a low confidence. For example, system 200 may attempt to recognize individual 910 based on face 911 or voice 912, as described above. If a match is not identified, or if a match is determined to have a low confidence (e.g., by determining a confidence score based on a degree of matching and comparing the confidence score to a confidence threshold), system 200 may prompt user 100 to provide additional input through user interface 950. Alternatively or additionally, user interface 950 may be accessed by user 100, for example, by selecting an option to manually identify an individual.

As shown in FIG. 9B, user interface 950 may include one or more elements 954 representing individuals that may correspond to individual 910. In some embodiments, user interface 950 may display individuals known by or associated with user 100. For example, system 200 may access a database (e.g., database 252) containing information about individuals known to user 100, such as friends, colleagues, acquaintances, or other contacts. Accordingly, elements 954 may allow user 100 to easily and quickly select an individual to be associated with an individual present in the current environment of user 100. In some embodiments, elements 954 may be sorted according to various criteria. For example, if a voice or face of individual 910 is detected, elements 954 may be sorted according to a best match to the detected voice or facial features (e.g., based on a confidence score indicating a degree of match to a stored voiceprint or facial feature data). Alternatively or additionally, elements 954 may be sorted based on other factors, such as a frequency at which the individual is encountered by user 100, a closeness of relationship to user 100, or similar factors. In some embodiments, user interface 950 may include other elements for specifying an individual. For example, user interface 950 may include a text-based search element 952 for searching for an individual based on a name or other characteristic of the individual. As another example, user interface 950 may include an element 956 to create a new contact, which may open a new interface to allow user 100 to specify the name of an individual and/or other information. Once an individual has been selected or otherwise specified through user interface 950, system 200 may update a profile associated with the specified individual. For example, if user 100 selects element 954, system 200 may update stored profile information based on face 911, voice 912, or any other relevant information.

In some embodiments, earphone 110 may detect the voice of an individual that is not within the field of view of earphone 110. Returning to FIG. 9A, this may include determining that one or more of sounds 921 and 921, which may correspond to the voice of an individual, are coming from outside of region 930. For example, the voice may be heard over a speakerphone, from a back seat, or the like. In such embodiments, recognition of an individual may be based on the voice of the individual only, in the absence of a speaker in the field of view or in the absence of an image sensor. Processor 110 may analyze the voice of the individual as described above, for example, by determining whether the detected voice matches a voiceprint of an individual in database 252.

After determining that individual 910 is a recognized individual of user 100, processor 310 may cause selective conditioning of audio associated with the recognized individual. The conditioned audio signal may be transmitted to hearing interface device 810, and thus may provide user 100 with audio conditioned based on the recognized individual. For example, the conditioning may include amplifying audio signals determined to correspond to sound 920 (which may correspond to voice 912 of individual 910) relative to other audio signals. In some embodiments, amplification may be accomplished digitally, for example by processing audio signals associated with sound 920 relative to other signals. Additionally, or alternatively, amplification may be accomplished by changing one or more parameters of audio sensor 340 to focus on audio sounds associated with individual 910. For example, audio sensor 340 may be a directional microphone and processor 310 may perform an operation to focus audio sensor 340 on sound 920. Various other techniques for amplifying sound 920 may be used, such as using a beamforming microphone array, acoustic telescope techniques, etc.

In some embodiments, processor 310 may perform further analysis based on captured images or videos to determine how to selectively condition audio signals associated with a recognized individual. In some embodiments, processor 310 may analyze the captured images to selectively condition audio associated with one individual relative to others. For example, processor 310 may determine the direction of a recognized individual relative to the user based on the images and may determine how to selectively condition audio signals associated with the individual based on the direction. If the recognized individual is standing to the front of the user, audio associated with that user may be amplified (or otherwise selectively conditioned) relative to audio associated with an individual standing to the side of the user. Similarly, processor 310 may selectively condition audio signals associated with an individual based on proximity to the user. Processor 310 may determine a distance from the user to each individual based on captured images or based on voice volume and may selectively condition audio signals associated with the individuals based on the distance. For example, an individual closer to the user may be prioritized higher than an individual that is farther away.

In some embodiments, selective conditioning of audio signals associated with a recognized individual may be based on the identities of individuals within the environment of the user. For example, where multiple individuals are detected in the images, processor 310 may use one or more facial recognition techniques to identify the individuals, as described above. Audio signals associated with individuals that are known to user 100, for example recognized in an image or identified in accordance with one or more voiceprints, may be selectively amplified or otherwise conditioned to have priority over unknown individuals. For example, processor 310 may be configured to attenuate or silence audio signals associated with bystanders in the user's environment, such as a noisy office mate, etc. In some embodiments, processor 310 may also determine a hierarchy of individuals and give priority based on the relative status of the individuals. This hierarchy may be based on the individual's position within a family or an organization (e.g., a company, sports team, club, etc.) relative to the user. For example, the user's boss may be ranked higher than a co-worker or a member of the maintenance staff and thus may have priority in the selective conditioning process. In some embodiments, the hierarchy may be determined based on a list or database. Individuals recognized by the system may be ranked individually or grouped into tiers of priority. This database may be maintained specifically for this purpose or may be accessed externally. For example, the database may be associated with a social network of the user (e.g., Facebook™, LinkedIn™, etc.) and individuals may be prioritized based on their grouping or relationship with the user. Individuals identified as "close friends" or family, for example, may be prioritized over acquaintances of the user.

Selective conditioning may be based on a determined behavior of one or more individuals determined based on the captured images. In some embodiments, processor 310 may be configured to determine a look direction of the individuals in the images. Accordingly, the selective conditioning may be based on behavior of the other individuals towards the recognized individual. For example, processor 310 may selectively condition audio associated with a first individual that one or more other users are looking at. If the attention of the individuals shifts to a second individual, processor 310 may then switch to selectively condition audio associated with the second user. In some embodiments, processor 310 may be configured to selectively condition audio based on whether a recognized individual is speaking to the user or to another individual. For example, when the recognized individual is speaking to the user, the selective conditioning may include amplifying an audio signal associated with the recognized individual relative to other audio signals received from directions outside a region associated with the recognized individual. When the recognized individual is speaking to another individual, the selective conditioning may include attenuating the audio signal relative to other audio signals received from directions outside the region associated with the recognized individual.

In some embodiments, processor 310 may have access to one or more voiceprints of individuals, which may facilitate selective conditioning of voice 912 of individual 910 in relation to other sounds or voices. Having a speaker's voiceprint, and a high quality voiceprint in particular, may provide for fast and efficient speaker separation. A high quality voice print may be collected, for example, when the user speaks alone, preferably in a quiet environment. By having a voiceprint of one or more speakers, it is possible to separate an ongoing voice signal almost in real time, e.g. with a minimal delay, using a sliding time window. The delay may be, for example 10 ms, 20 ms, 30 ms, 50 ms, 100 ms, or the like. Different time windows may be selected, depending on the quality of the voice print, on the quality of the captured audio, the difference in characteristics between the speaker and other speaker(s), the available processing resources, the required separation quality, or the like. In some embodiments, a voice print may be extracted from a segment of a conversation in which an individual speaks alone, and then used for separating the individual's voice later in the conversation, whether the individual's is recognized or not.

Figure 10:
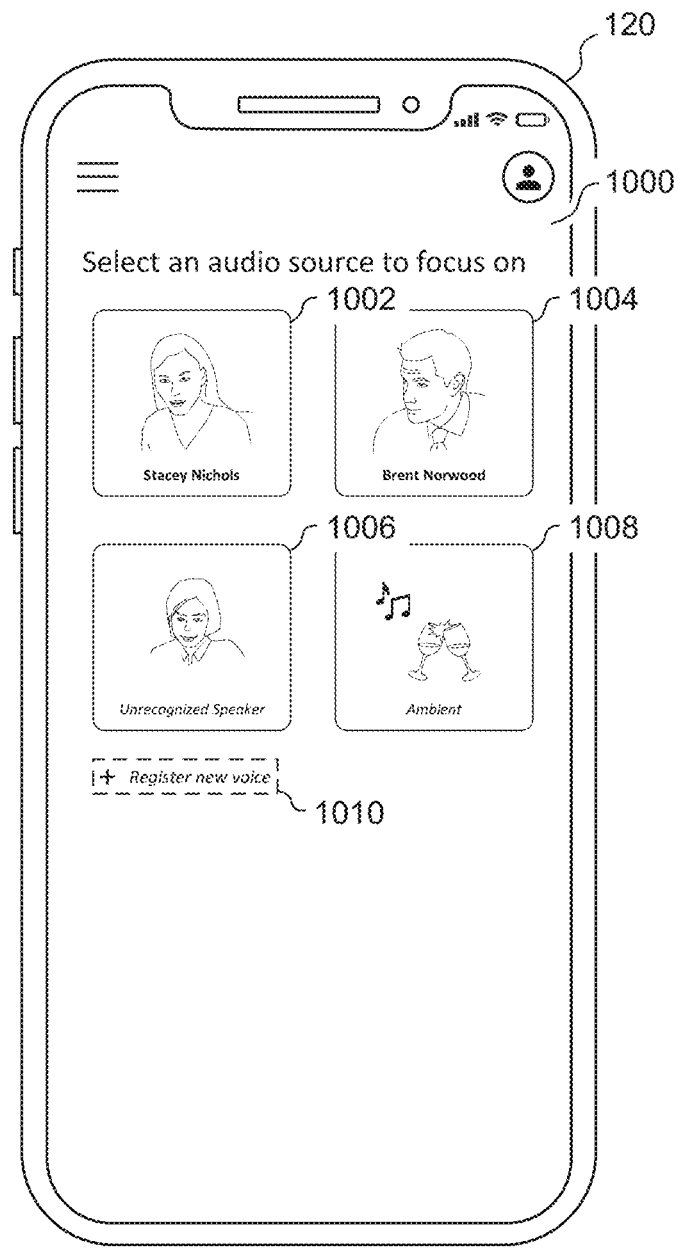
FIG. 10 illustrates an example user interface that may be used to select a voice or other audio source for selective conditioning, consistent with the disclosed embodiments.

In some embodiments, for example when the device does not comprise an image sensor, the user may indicate which individuals he or she would like to hear in the current context. The user may use an I/O device, such as a mobile phone or other device paired to the system, and may select from a list one or more individuals for which the user has a voiceprint. FIG. 10 illustrates an example user interface 1000, which may be used to select a voice or other audio source for selective conditioning, consistent with the disclosed embodiments. User interface 1000 may include one or more selectable elements 1002, 1004, 1006, and 1008, which may represent audio sources in the current environment of user 100. In some embodiments, system 200 may recognize a voice of one or more individuals in the environment of user 100. For example, elements 1002 and 1004 may be associated with individuals for which a voiceprint is stored. Accordingly, elements 1002 and 1004 may include stored information associated with the recognized individual, such as a name of the individual or other personal information. Although elements 1002, 1004, 1006, and 1008 show images of the individuals, it is to be appreciated that these images may be absent. In some embodiments, a default image may be displayed.

In some embodiments, user interface 1000 may display additional elements associated with unrecognized individuals. For example, earphone 110 may detect a voice of a speaker for which no voiceprint match is determined (or a match confidence is below a threshold). Accordingly, user interface 1000 may display an element 1006 associated with the user. In some embodiments, user interface 1000 may include an element 1008 representing background or ambient noise (e.g., sound 922), which may encompass sounds not associated with elements 1002, 1004, and 1006.

User interface 1000 may allow user 100 to select one or more audio sources for selective conditioning via elements 1002, 1004, 1006, and 1008. Then, when any of the selected individuals speaks, the voice will be amplified or otherwise enhanced. For example, in a restaurant, the user may select to hear the people he is dining with but not others. In the example shown in FIG. 10, by selecting element 1002, a voice of an individual associated with element 1002 may be amplified relative to sounds associated with elements 1004, 1006, and 1008. This may include various other forms of selective conditioning as described herein. In some embodiments, user interface 1000 may allow a user to select multiple elements. For example, if user 100 selects both of elements 1002 and 1004, voices associated with these sources may be amplified or otherwise conditioned relative to sounds associated with elements 1006 and 1008. In some embodiments, the selective conditioning may be tuned or adjusted for each source. For example, selecting one of elements 1002, 1004, 1006, and 1008 may bring up a display of one or more options associated with the audio source. For example, this may include selecting and holding an element in user interface 1000 or various other selection mechanisms. The options may include an adjustable volume control to vary the degree of amplification relative to other audio sources. In some embodiments, the options may also include muting or silencing a particular audio source.

User interface 1000 may further include an element 1010 to register a new voiceprint of a user. For example, if the user wishes to add another individual for which no voiceprint is available, the user may select element 1010 and ask the individual to speak. Computing device 120 device may be configured to capture the individual's voice and/or to extract a voiceprint and store it in association with an identifier of the individual, as described above. In some embodiments, computing device 120 may prompt user 100 to enter additional information about the individual, such as a name, relationship, or other information that may be stored in association with the individual. In some embodiments, system 200 may store voiceprints for individuals automatically. For example, if an individual associated with element 1006 is detected but is not recognized, system 200 may store the voiceprint in association with an identifier of the individual. By selecting element 1006, user interface 1000 may allow user 100 to add additional information to be stored in association with the individual. In some embodiments, these automatically generated profiles may be temporary. For example, system 200 may remove a stored voiceprint associated with element 1006 after a predetermined time interval where the voiceprint is not saved by user 100, is not recognized again, or the like.

According to some embodiments, system 200 may store default preferences associated with one or more individuals. For example, user 100 may specify that a voice associated with element 1002 should be amplified or otherwise selectively conditioned by default. Accordingly, user interface 1000 may initially show element 1002 as being selected, which user 100 can manually unselect. In some embodiments, user 100 may prioritize one or more individuals relative to each other. For example, an individual associated with element 1004 may have a rank or preference level that is higher than an individual associated with element 1002. Accordingly, the voice of an individual associated with element 1004 may be amplified relative to the voice of an individual associated with element 1002 by default.

Separating voices may be performed as follows: spectral features, also referred to as spectral attributes, spectral envelope, or spectrogram may be extracted from a clean audio of a single speaker and fed into a pre-trained first neural network, which generates or updates a signature of the speaker's voice based on the extracted features. The audio may be for example, of one second of clean voice. The output signature may be a vector representing the speaker's voice, such that the distance between the vector and another vector extracted from the voice of the same speaker is typically smaller than the distance between the vector and a vector extracted from the voice of another speaker. The speaker's model may be pre-generated from a captured audio. Alternatively or additionally, the model may be generated after a segment of the audio in which only the speaker speaks, followed by another segment in which the speaker and another speaker (or background noise) is heard, and which it is required to separate.

Then, to separate the speaker's voice from additional speakers or background noise in a noisy audio, a second pre-trained neural network may receive the noisy audio and the speaker's signature, and output an audio (which may also be represented as attributes) of the voice of the speaker as extracted from the noisy audio, separated from the other speech or background noise. It will be appreciated that the same or additional neural networks may be used to separate the voices of multiple speakers. For example, if there are two possible speakers, two neural networks may be activated, each with models of the same noisy output and one of the two speakers. Alternatively, a neural network may receive voice signatures of two or more speakers, and output the voice of each of the speakers separately. Accordingly, the system may generate two or more different audio outputs, each comprising the speech of the respective speaker. In some embodiments, if separation is impossible, the input voice may only be cleaned from background noise.

In some embodiments, when an individual has been recognized, earphone 110 and/or additional earphone 710 may be configured to present the name of the individual to the ear of the user through hearing interface 350. For example, this may include performing a lookup function based on detected facial features and/or voice signatures to determine the name of individual 910. In some embodiments, earphone 110 and additional earphone 710 may present the name of individual 910 in a manner that the name will be perceived to the user as coming from the direction of individual 910. For example, based on variations in the timing and amplitude of how the name is presented in earphone 110 and additional earphone 710, a direction that the name of the user is presented from may be simulated. This simulated directionality may help user 100 determine which individual in environment 900 the name belongs to. Any other sounds presented to user 100 described herein, such as processed audio signals, etc. may similarly be presented with a simulated directionality when additional earphone 710 is used.

Figure 11:
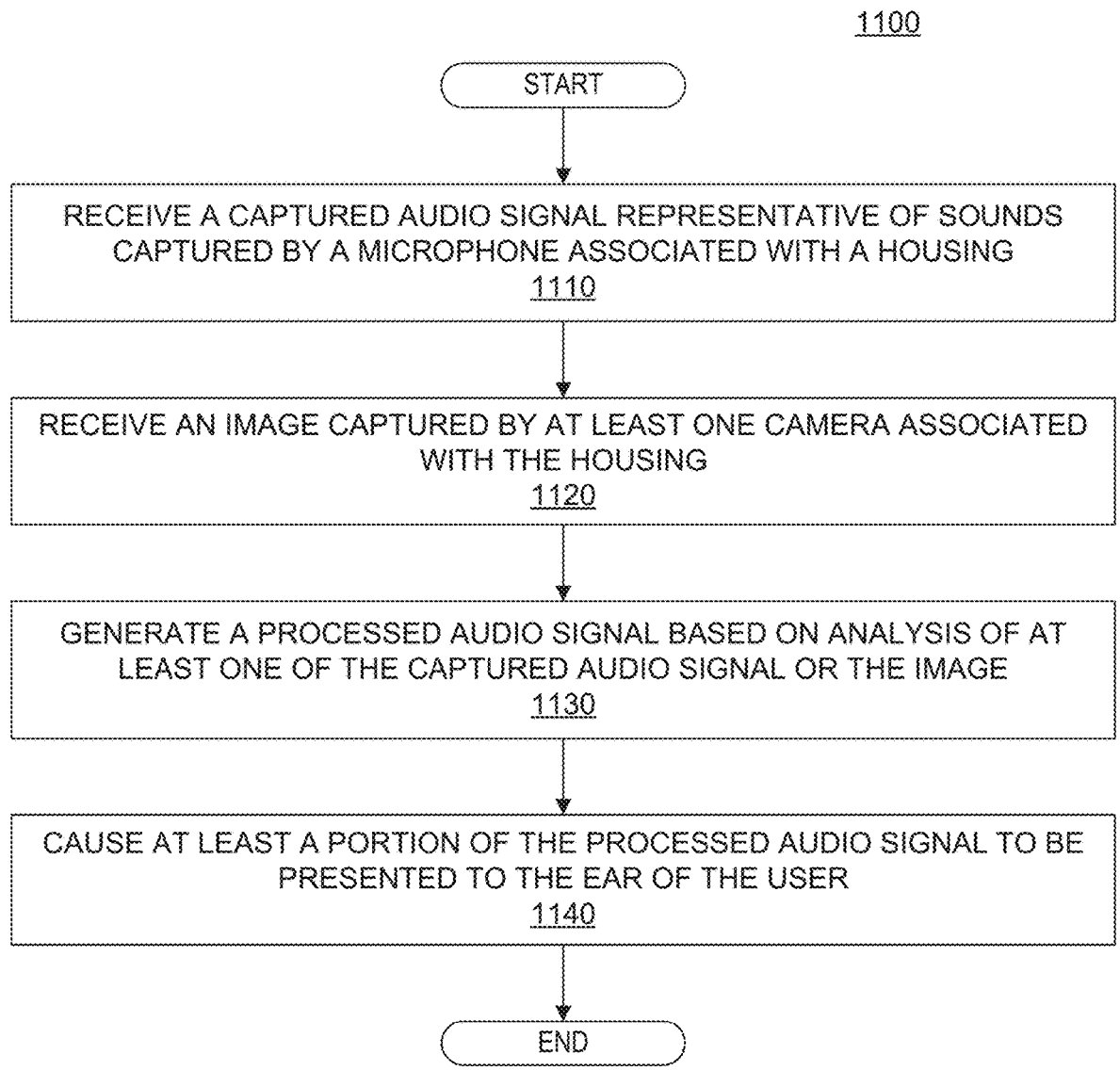
FIG. 11 is a flowchart showing an example process for generating processed audio signals, consistent with the disclosed embodiments.

FIG. 11 is a flowchart showing an example process 1100 for generating processed audio signals, consistent with the disclosed embodiments. Process 1100 may be performed by at least one processing device of a hearing interface device, such as processor 310. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1100. Further, process 1100 is not necessarily limited to the steps shown in FIG. 11, and any steps or processes of the various embodiments described throughout the present disclosure may also be included in process 1100.

In step 1110, process 1100 may include receiving a captured audio signal representative of sounds captured from an environment of the hearing interface device. The sounds may be captured by at least one microphone associated with the housing. For example, step 1110 may include receiving sounds captured by microphone 340, as described above. The microphone may be associated with the housing in that it may be at least partially contained within the housing, affixed to the housing, protruding from the housing, or otherwise integrated with the housing.

In step 1120, process 1100 may include receiving at least one image captured from the environment of the hearing interface device. The at least one image may be captured by at least one camera associated with the housing. For example, step 1120 may include receiving at least one image captured by image sensor 330, as described above. The camera may be associated with the housing in that it may be at least partially contained within the housing, affixed to the housing, protruding from the housing, or otherwise integrated with the housing. In some embodiments, the at least one camera may have a line of sight that is substantially aligned to a line of sight of a user of the hearing interface device when the housing is placed in the ear of the user. In some embodiments, the camera may have a relatively narrow view angle. For example, the at least one camera may have an angle of view between 50 degrees to 120 degrees, as described above.

In step 1130, process 1100 may include generating a processed audio signal based on analysis of at least one of the captured audio signal or the at least one image. This may include various forms of processing described throughout the present disclosure. In some embodiments, generating the processed audio signal may include amplifying a voice of an individual represented in the captured audio signal relative to at least one additional sound. As described herein, amplifying the voice of the individual may include separating the voice of the individual from the at least one additional sound. For example, the at least one additional sound may include a background noise and amplifying the voice of the individual relative to the at least one additional sound may include attenuating the background noise.

In some embodiments, the voice of the individual may be amplified based on a determination that the individual is a recognized individual. For example, amplifying the voice of the individual may include identifying the individual based on the at least one image based on facial features, which may be compared to a database of stored facial features associated with known individuals. As another example, amplifying the voice of the individual may include identifying the individual based on a voice signature associated with the individual. This may include determining a voiceprint of the individual and comparing the voiceprint to a database of voice signatures of known individuals. In some embodiments, the voice of the individual may be amplified based on a determination that the individual is speaking. For example, amplifying the voice of the individual may include tracking a lip movement of the individual represented in the at least one image and determining the individual is speaking based on the tracked lip movement. Alternatively or additionally, the voice of the individual may be amplified based on a selection of the individual by user 100. For example, computing device 120 may display user interface 1000 as described above, which may allow user 100 to select the individual from a plurality of audio sources detected in the environment of user 100. In some embodiments, this ability to selectively condition audio based on selection of an audio source may occur in the absence of image data (e.g., where a camera is blocked or where earphone 110 does not include a camera).

In some embodiments, the audio signal may be processed based on information received from another hearing interface device, such as additional earphone 710 described above. Accordingly, process 1100 may further include receiving data obtained from an associated hearing interface device, which may be configured to be at least partially inserted into an additional ear of the user or placed anywhere else, for example, as a necklace, a pin, attached to the user's glasses or the like, and the processed audio signal may further be generated based on analysis of the received data. In some embodiments, the received data may include at least one of a voice signature, a lip signature, or a facial feature of an individual in the environment of the user. The voice signature, the lip signature, or the facial feature may be determined by the associated hearing interface device based on at least one of the additional captured audio signal or the additional image. In some embodiments, process 1100 may further include determining at least one of an additional facial feature, an additional lip signature, or an additional voice signature of an additional individual based on at least one of the captured audio signal or the at least one image, the additional individual being different from the individual. In some embodiments, generating the processed audio signal may include determining a direction of at least one audio source represented in the captured audio signal. When an additional hearing interface device is used, this may be based on information captured by both of the hearing interface devices. For example, the direction being determined based on a first indication of direction of the audio source determined based on the captured audio signal and a second indication of direction of the audio source included in the received data.

In step 1140, process 1100 may include causing at least a portion of the processed audio signal to be presented to the ear of the user. For example, this may include presenting the processed audio signal or a portion thereof to an ear of user 100 using hearing interface 350.

In some embodiments, process 1100 may include additional steps, including those described above. For example, process 1100 may include causing an insertion indication to be presented to the ear of the user when at least a portion of the housing is inserted into the ear of the user. As described above, this may further include determining whether the housing is correctly inserted into the ear of the user. The insertion indication may comprise a first sound when the housing is correctly inserted into the ear of the user and a second sound when the housing is not correctly inserted into the ear of the user. The determination whether the housing is correctly inserted into the ear of the user may be based on an indication received from an accelerometer included in the housing, a sensor output (e.g., an output of sensor 606), an image captured using image sensor 330 or any other information that may indicate a proper insertion.

In some embodiments, process 1100 may further include providing information for locating the hearing interface device to a user. For example, process 1100 may include receiving, from an external source, a request to provide information for locating the hearing interface device. The external source may be a server (e.g., server 250), an auxiliary device (e.g., computing device 120), an additional hearing interface device (e.g., additional earphone 710), or various other sources. Process 1100 may include causing, based on the request, locating information to be captured from the environment of the hearing interface device based on the received request. The locating information may include at least one of a locating image captured using the at least one camera (e.g., image 1020) or a locating audio signal obtained using the at least one microphone. Process 1100 may then include transmitting the locating information to a predetermined destination. For example, this may include transmitting the locating information to a server (e.g., server 250), an auxiliary device (e.g., computing device 120), an additional hearing interface device (e.g., additional earphone 710), or various other destinations. In some embodiments, the predetermined location may be associated with the external source (e.g., a server). For example, if the request is received from the server, the locating information may be transmitted back to the server (i.e., a predetermined location at or associated with the server). Alternatively or additionally, the predetermined location may not be associated with the external source.

As another example, process 1100 may further include generating an indication of a detected condition of the hearing interface device. For example, process 1100 may include detecting a condition associated with the hearing interface device and causing a status indication to be presented to the ear of the user based on the detected condition, as described above. In some embodiments, the condition may include an obstruction of a field of view of the at least one camera, which may be detected based on analysis of the at least one image (e.g., based on analysis of image 1010 as described above), a battery health status, or the like.

Earphone Smartcase for Audio Processing

As described herein, system 200 may include an earphone case 130, which may be used to store and/or charge one or more earphones 110. For example, earphone case 130 may include one or more compartments for receiving earphones 110 and may include one or more power interfaces for replenishing a charge for power source 370. Earphone case 130 may further include a substantially rigid outer housing to protect earphones 110 from damage or exposure to foreign substances when not in use. In some embodiments, earphone case 130 may further include one or more processors for processing audio signals captured by earphone 110. Thus, the processing within system 200 may be distributed between processors located within the housings of the one or more earphones 110, and one or more processors located within earphone case 130.

In some embodiments, processing tasks may be distributed based on a processing demand or other properties associated with the processing task. For example, processing tasks that are computationally inexpensive, that do not require application of a trained machine learning model, or other categories of tasks may be performed by the processors within the earphone housing. For example, processing performed at earphone 110 may include filtering stationary noise, equalizing, volume control, communication with an external device such as a smartphone, a laptop, or the like. Further processing, which may be more resource consuming, may be performed by a stronger processor, located within the storage and charging earphone case 130. For example, processing performed at earphone case 130 may include spectral subtraction, providing communication between the two earphones, speech enhancement or any other forms of processing tasks. Accordingly, the inclusion of a processing device in earphone case 130 may allow for more efficient processing of audio signals through distributed processing within system 200. The disclosed embodiments may further reduce the processing requirements for processor 310 and thus may allow for a more compact or cost-effective design of earphone 110.

Figure 12:
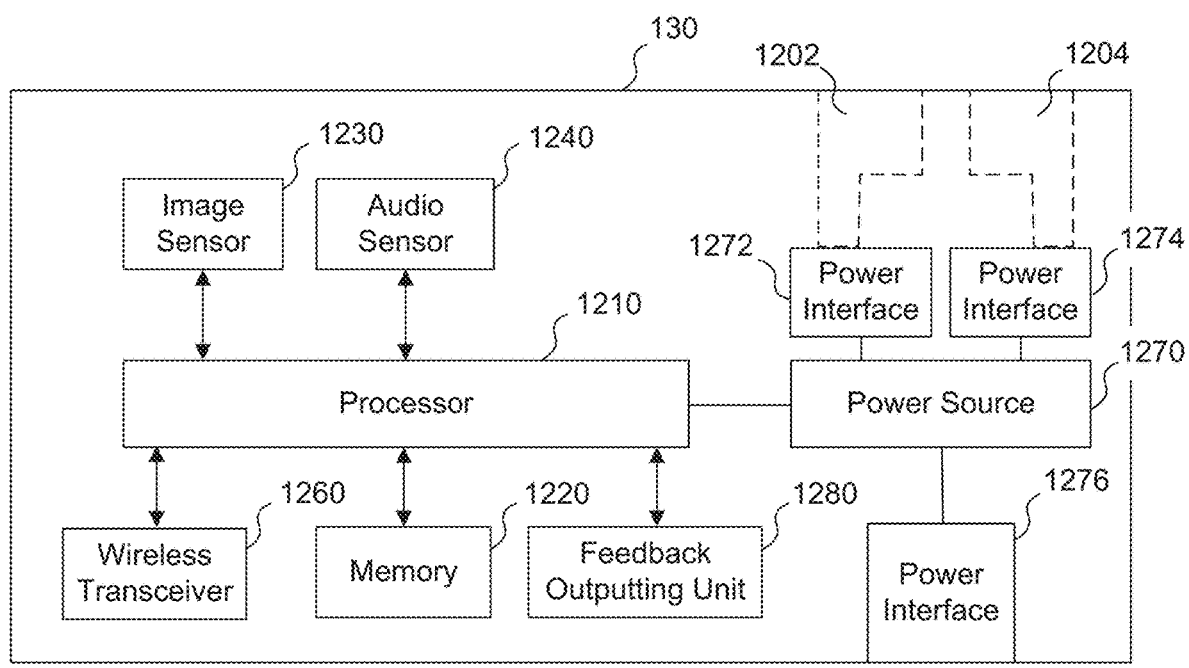
FIG. 12 is a block diagram illustrating the components of an earphone according to an example embodiment.

FIG. 12 is a block diagram illustrating the components of earphone case 130 according to an example embodiment. As shown in FIG. 12, earphone case 130 may include a processor 1210, an audio sensor 1240, an image sensor 1230, a wireless transceiver 1260, a memory 1220, a power source 1270, one or more compartments 1202 and 1204, and one or more power interfaces 1272, 1274, and 1276. Earphone case 130 is not limited to the components shown in FIG. 12 and may include other of fewer components depending on the application. For example, image sensor 1230 may not be present in earphone case 130 in some embodiments. For example, in some embodiments earphone case 130 may also include buttons, other sensors such as a proximity sensor or similar sensors, and inertial measurements devices such as accelerometers, gyroscopes, magnetometers, temperature sensors, color sensors, light sensors, etc. Earphone case 130 may further include a data port with one or more suitable interfaces for connecting with an external device (not shown). In some embodiments, earphone case 130 may not include an image sensor and/or an audio sensor.

As with processor 310, processor 1210 may include any suitable processing device and may include more than one processing device. For example, processor 1210 may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by processor 1210 may, for example, be pre-loaded into a memory integrated with or embedded into processor 1210 or may be stored in a separate memory (e.g., memory 1220). Processor 1210 may be configured to generate a processed audio signal based on analysis of a captured audio signal or a captured image, as described throughout the present disclosure. For example, this may include executing instructions stored in memory 1220 to perform selective conditioning of audio signals, analyze lip movements or other gestures and/or voice signatures, or various other analyses described above with respect to processor 310. Processor 310 may process audio signals (or portions thereof) captured using audio sensor 340 of earphone 110 and received through wireless transceiver 1260. In some embodiments, this may further include analyzing image data (which may be captured using image sensor 330, 1230, or both) and/or audio data captured using audio sensor 1240. Memory 1220 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Image sensor 1230, if present, may be configured to detect and convert optical signals into electrical signals, which may be used to provide information for an image or a video stream (i.e., image data) based on the detected signal, similar to image sensor 320. For example, image sensor 1230 may include a semiconductor charge-coupled device (CCD), an active pixel sensor in complementary metal-oxide-semiconductor (CMOS), or an N-type metal-oxide-semiconductor (NMOS or Live MOS). Image sensor 1230 may be part of a camera included in the same housing as earphone case 130. Although image sensor 1230 is described generally herein as an optical camera, it is to be understood that image sensor 1230 is not limited to this form of capturing device, and any sensor that outputs information about the structure or appearance of the environment may be used, such a video camera, a still camera, a wide angle camera, a narrow angle camera, a thermal camera, a radar device, a Simultaneous Localization and Mapping (SLAM) device, or various other forms of sensors. In some embodiments, the camera may be a black and white camera, which may have advantages such as a better signal-to-noise (SNR) ratio, a better resolution, a simpler lens or other components, or the like.

Audio sensor 1240 may be configured to capture one or more sounds from an environment of earphone case 130, similar to audio sensor 340 described herein. In some embodiments, audio sensor 1240 may also be configured to determine a directionality of sounds in the environment of a user. For example, audio sensor 1240 may comprise one or more directional microphones, which may be more sensitive to picking up sounds in certain directions. In some embodiments, audio sensor 1240 may comprise a unidirectional microphone, designed to pick up sound from a single direction or small range of directions. Audio sensor 1240 may also comprise a cardioid microphone, which may be sensitive to sounds from the front and sides. Audio sensor 1240 may also include a microphone array, and thus audio sensor 1240 may include multiple microphones.

Earphone case 130 may further include a wireless transceiver 1260, which may be the same as or similar to wireless transceiver 360 described above. Wireless transceiver 1260 may use any known standard to transmit and/or receive data (e.g., Wi-Fi, Bluetooth®, Bluetooth Smart, 802.15.4, or ZigBee). In some embodiments, wireless transceiver 1260 may communicate over a network (e.g., network 240), which may include the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or various other types of network communications. In some embodiments, wireless transceiver 1260 may transmit and receive data through communications with one or more of earphone(s) 110, computing device 120, and/or server 250, as indicated in FIG. 2. For example, this may include receiving instructions or requests to perform operations (e.g., capture an image, transmit data, generate a processed audio signal, etc.), data used for analysis (e.g., models or other programming tools used to process audio signals, voice signature data, facial feature data, etc.), update information (e.g., software updates, firmware updates, etc.), or any other data that may be relevant to processing audio signals. Although wireless transceiver 1260 is shown to communicate directly with various components within system 200, in some embodiments, these communication paths may include various intermediate components.

In some embodiments, processor 1210 may communicate data to feedback-outputting unit 1280, which may include any device or component configured to provide information to a user 100. Feedback outputting unit 1280 may include one or more feedback systems for providing the output of information to user 100. In the disclosed embodiments, the audible or visual feedback may be provided via any type of connected audible, visual or tactile system or any combination of the above. Feedback of information according to the disclosed embodiments may include audible feedback to user 100 (e.g., using a Bluetooth™ or other wired or wirelessly connected speaker, or a bone conduction headphone). Feedback outputting unit 1280 of some embodiments may additionally or alternatively produce a visible output of information to user 100, for example, through an LED, display, or other visual indicator provided as part of earphone case 130 (or a separate device, such as computing device 120). Feedback outputting unit 1280 may be provided as part of earphone case 130 (as shown) or may be provided external to earphone case 130 and communicatively coupled thereto, for example as part of earphone 110.

As with power source 370 described above, power source 1270 may include one or more batteries (e.g., nickel-cadmium batteries, nickel-metal hydride batteries, and lithium-ion batteries) or any other type of electrical power supply. In other embodiments, power source 1270 may be rechargeable and contained within the housing of earphone case 130. In yet other embodiments, power source 1270 may include one or more energy harvesting devices for converting ambient energy into electrical energy (e.g., portable solar power units, human vibration units, etc.). Power interface 1276 may include one or more conductive pins, ports, cables, or other conductive elements configured to receive energy from an external power source, which may be provided to and retained in power source 1270.

As further shown in FIG. 12, earphone case 130 may include at least one compartment, such as compartments 1202 and 1204. Compartments 1202 and 1204 may each be configured to receive an earphone 110. For example, compartment 1202 may be configured to receive earphone 110 and compartment 1204 may be configured to receive earphone 710. Accordingly, earphone case 130 may be configured to store one or more earphones within compartments 1202 and 1204. While two separate compartments are shown in FIG. 12 by way of illustration, various other configurations may be used. For example, a single compartment may be configured to hold multiple earphones 110.

Earphone case 130 may further include one or more power interfaces configured to provide power to earphone 110. For example, earphone case 130 may include power interface 1272 and power interface 1274, as shown. Power interfaces 1272 and 1274 may each be configured to electronically couple with power interface 372 of a corresponding earphone 110 when earphone 110 is housed in earphone case 130. Through this coupling, power may be transferred from power source 1270 to one or more of power sources 370, or vice versa. Accordingly, power interfaces 1272 and 1274 may be positioned relative to compartments 1202 and 1204 such that power interfaces 1272 and 1274 align with a corresponding power interface 372 when earphones 110 and 710 are received in compartments 1202 and 1204.

Figure 13A:
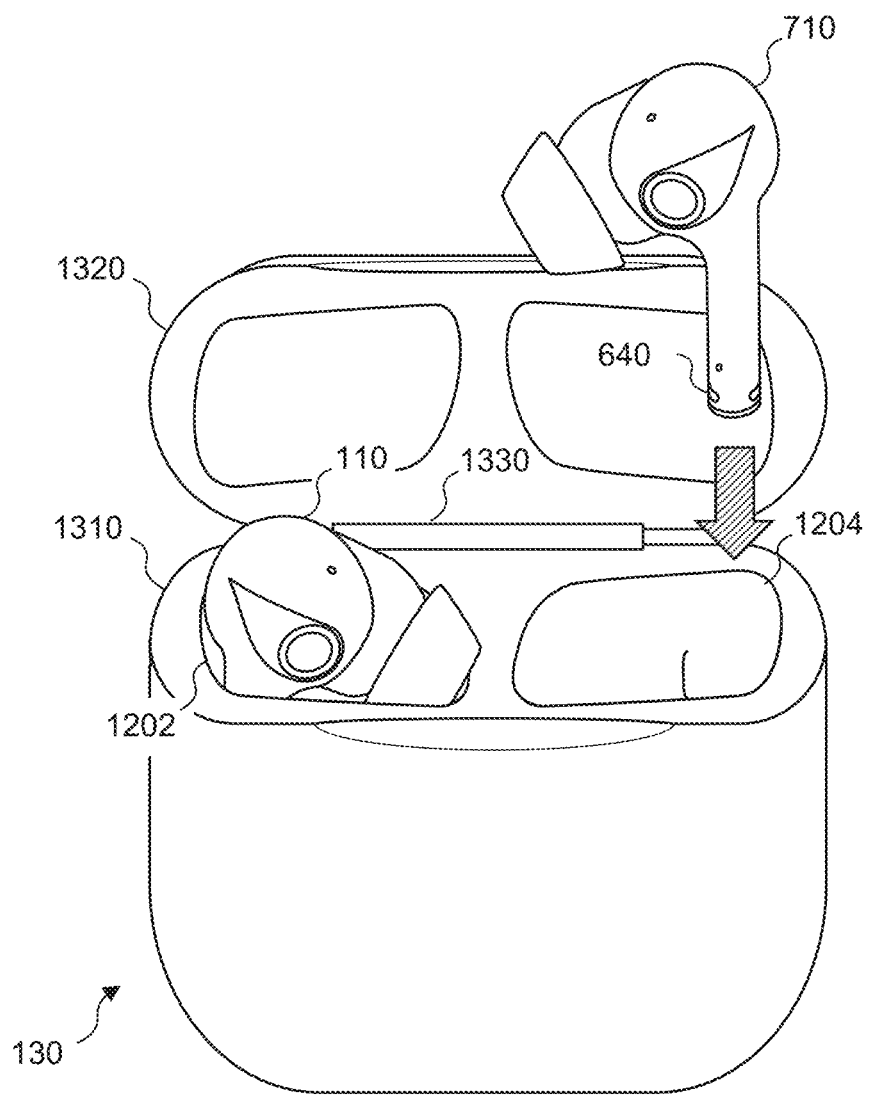
FIGS. 13A and 13B illustrate an example configuration of an earphone case, consistent with the disclosed embodiments.

FIG. 13A illustrates an example configuration of earphone case 130, consistent with the disclosed embodiments. As shown in FIG. 13A, earphone case 130 may be configured to receive earphones 110 and 710 in compartments 1202 and 1204, respectively. In this example, charging port 640 may be positioned relative to earphone 710 to enable a connection with power interface 1274. For example, charging port 640 may be configured as two or more conductive plates configured to couple with corresponding pins or plates within compartment 1204. Charging port 640 is shown by way of example in FIG. 13A and various other configurations may be used, including the configuration shown in FIG. 6D. In some embodiments, earphone case 130 may include a first housing component 1310 and a second housing component 1320. Housing components 1310 and 1320 may be movable relative to each other to allow earphones 110 and 710 to be inserted into and contained within earphone 130. For example, earphone case 130 may include a hinge 1330 allowing relative rotational movement between housing components 1310 and 1320. Earphone case 130 may further include a fastener (not shown in FIG. 13A) to retain housing components 1310 and 1320 relative to each other and maintain earphone case 130 in a closed state. For example, this may include a mechanical latch, a magnetic latch, or various other forms of fasteners.

Figure 13B:
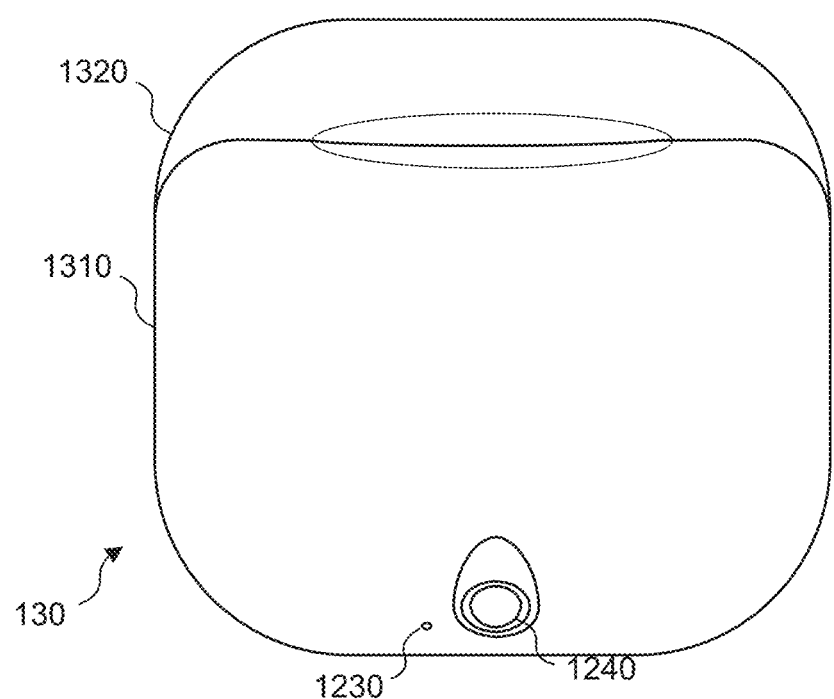

FIG. 13B illustrates a view of the example configuration of earphone case 130 shown in FIG. 13A from an alternate angle. As shown in FIG. 13B, earphone case 130 may optionally include a camera and a microphone, which may correspond to image sensor 1230 and audio sensor 1240, as shown. Image sensor 1230 and audio sensor 1240 may be positioned relative to earphone case 130 to facilitate the capture of images and/or audio signals by earphone case 130. For example, when earphone case 130 is placed on a table, image sensor 1230 and audio sensor 1240 may be positioned to capture images and audio signals representative of an environment of earphone case 130 and/or user 100, as described further below. In some embodiments, earphone case 130 may not include image and/or audio sensors.

Figure 14:
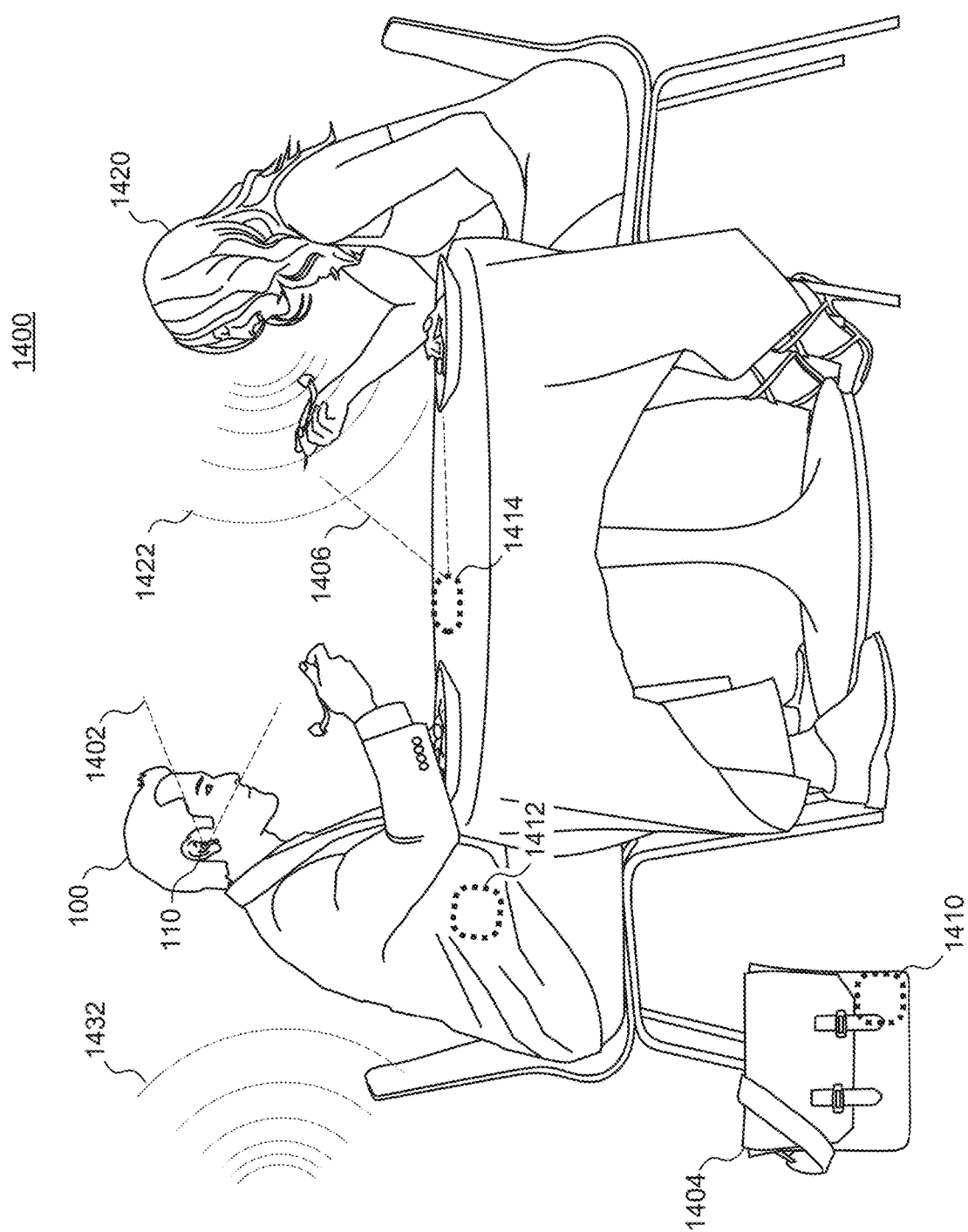
FIG. 14 illustrates an example environment for processing audio signals using an earphone case, consistent with the disclosed embodiments.

FIG. 14 illustrates an example environment 1400 for processing audio signals using an earphone case, consistent with the disclosed embodiments. As described herein, earphone 110 may be configured to generate one or more processed audio signals based on captured audio signals, captured images, or both. For example, environment 1400 may include an individual 1420, which may be the source of a sound 1422. For example, sound 1422 may include a voice of individual 1420. Environment 1400 may further include a sound 1432, which may be a background or ambient noise from various additional sources. Microphone 340 may be configured to capture audio signals associated with sounds 1422 and 1432 and processor 310 may be configured to selectively condition one or both of sounds 1422 and 1432, as described above. For example, selective conditioning may include amplifying audio signals determined to correspond to sound 1422 relative to sound 1432. While two audio sources are shown in environment 1400 by way of example, sounds from any number of audio sources may be identified and selectively conditioned relative to each other, as described herein.

Consistent with the disclosed embodiments, some or all of processing of an audio signal captured using earphone 110 may be performed by processor 1210. Accordingly, earphone 110 may be configured to capture an audio signal representative of sounds 1422 and 1432 and may transmit at least a portion of the captured audio signal to earphone case 130. For example, this may include transmitting at least a portion of the captured audio signal using wireless transceiver 360 (i.e., a first communication component). Earphone case 130 (which may be located, for example, in one of positions 1410, 1412, or 1414) may receive the transmitted portion of the captured audio signal using wireless transceiver 1260 (i.e., a second communication component), process the audio signal, and transmit at least a portion of the processed audio signal back to earphone 110. Accordingly, earphone 110 may be configured to present an audio signal to an ear of user 100, where at least a portion of the processing was performed using processor 1210 of earphone case 130.

The processing of a captured audio signal may be distributed between earphone 110, earphone 710, and earphone case 130 in a wide variety of manners. For example, the processing may be divided evenly among processors, divided unevenly among processors (e.g., based on processing speed, processing techniques, available resources, etc.), performed redundantly by multiple processors, or the like. In some embodiments, processing tasks may be assigned and distributed by processor 310. For example, processor 310 may analyze a captured audio signal, determine which processor(s) should perform one or more tasks, and may distribute portions of the audio signals to one or more of earphone 710 and/or earphone case 130, if needed. Alternatively or additionally, processor 1210 may be configured to assign and distribute tasks. For example, processor 310 may transmit a captured audio signal to earphone case 130 and processor 1210 may distribute portions of the audio signals to one or more of earphones 110 and 710, if needed. Accordingly, any configuration or sharing of processing capabilities may be used.

In some embodiments, processing allocations may be determined based, at least in part, on a type of analysis to be performed. For example, processor 1210 may have at least one performance characteristic that is advantageous relative to a corresponding performance characteristic of processor 310. The performance characteristic may include a number of processing cores, a processing speed, a processor configuration (e.g., a graphics processor unit vs. a central processing unit), or the like. As another example, processor 1210 may have access to different algorithms, models, or other processing tools compared to processor 310. For example, memory 1220 may store a trained machine learning model used to process audio signals, which may not be stored on memory 320 (e.g., due to size and/or performance constraints). Accordingly, processor 1210 may be better suited to handle certain tasks as compared to processor 310 and one or more tasks may be distributed to processor 1210 based on processor 310 being insufficient to perform the task. Alternatively, processors 310 and 1210 may be comparable in terms of processing capabilities, and tasks may be distributed to reduce the load on any one processor.

In some embodiments, processor 1210 may be configured to perform various specific tasks, as noted above. For example, processor 1210 may be configured to process lip movements of individuals, detect facial features, recognize an individual based on captured images (which may include recognizing facial features of individual 1420, determine a relative direction of one or more sound sources, identify individuals based on stored voiceprints, or various other tasks described herein. While various distributions of tasks are provided above, it is to be understood that various other distributions of tasks may be performed. In some embodiments, the shared processing between earphone 110 and additional earphone 710 may not be split by discrete tasks and may be distributed in other ways. For example, as noted above, processor 310 may be a primary processor and may assign specific processing operations to processor 1210 and the result of the individual processing operations may be provided to processor 310.

According to some embodiments, processor 1210 may only be used in certain situations. For example, processor 310 may be programmed to process captured audio signals and may initiate additional processing as needed. In some embodiments, additional processing may be initiated based on a quality or another aspect of a processed audio signal generated by processor 310. For example, the quality or aspect may include a signal-to-noise ratio (SNR) of the processed audio signal, a volume level associated with at least one audio source represented in the captured audio signal (e.g., sound 1422), or any other aspect of a processed audio signal that may indicate a processing quality.

In some embodiments, tasks may be allocated to processor 1210 based on the availability of other hardware of earphone case 130, such as image sensor 1230 and audio sensor 1240. For example, processor 310 may determine that additional information captured using image sensor 1230 and/or audio sensor 1240 may improve a quality of a processed audio signal and therefore may assign some or all of the processing to processor 1210. In some embodiments, earphone 110 may not include an image sensor and thus may assign any processing based on analysis of captured images to processor 1210. As another example, a field of view 1402 of image sensor 330 may be at least partially blocked or obstructed and processor 1210 may be used due to the unavailability or insufficiency of images captured using image sensor 330. As another example, audio sensor 1240 may have at least one aspect that is improved relative to audio sensor 330. For example, audio sensor 1240 may be a microphone array that is better suited to determined directionality of sounds, which may assist in separating distinct audio sources. Alternatively or additionally, audio sensor 330 may be at least partially blocked and therefore audio sensor 1240 may be needed. As another example, the use of multiple audio sensors 340 and 1240 may be used to distinguish sounds from different sources (e.g., by comparing variations in amplitudes in multiple signals, etc.). Accordingly, processor 1210 may be configured to process the captured audio signal based on an additional audio signal captured using audio sensor 1240 and/or at least one image captured using image sensor 1230.

Some embodiments of the present disclosure may include advising or reminding user 100 to use earphone case 130 for processing audio signals. For example, in some situations, some or all of the processing capabilities of earphone case 130 may be at least temporarily unavailable or insufficient for the current conditions. In other words, earphone case 130 may not be in functional state for generating a processed audio signal. In some embodiments, processor 1210 may be unavailable entirely. For example, earphone case 130 may be out of range of earphone 110 and thus a communication signal between earphone case 130 and earphone 110 may be weak or may not be received. As another example, a battery level of power source 1270 may be low or depleted, which may prevent some or all processing capabilities of processor 1210. As another example, a current state of earphone case 130 may similarly prevent some or all processing capabilities of processor 1210. For example, this may occur when earphone case 130 is switched off, is in a power-saving mode, is damaged or in an error state, or the like.

In some embodiments, earphone case 130 may be deemed to not be in a functional state based on a specific functionality of earphone case 130 being unavailable. For example, despite being in an on state and within range of earphone 110, various specific features of earphone case 130 may be disabled. As one example, image sensor 1230 and/or audio sensor may be at least partially blocked or obstructed, which may prevent sufficient image or audio data from being captured by earphone case 130. For example, when earphone case is located in a bag 1404 of user 100 (position 1410) or a pocket of user 100 (position 1412), earphone case 130 may not be able to capture sufficient audio or image data. In some embodiments, this may be determined by processor 1210. For example, processor 1210 may analyze one or more images captured by image sensor 1230 and/or one or more audio signals captured by audio sensor 1240 and determine that one or both of image sensor 1230 and/or audio sensor 1240 is not able to function properly (e.g., through dark or obstructed images, muffled audio signals, etc.). In some embodiments, this may be determined based on a specific audio source (e.g., individual 1420) not being represented in captured audio or image data. For example, earphone case 130 may be placed in position 1414 but may be turned away from individual 1420 such that individual 1420 is not in a field of view 1420 of image sensor 1230. Based on this assessment, processor 1210 may report to processor 310 that at least one function of earphone case 130 is unavailable or is not operational. In some embodiments, processor 1210 may assess the captured image and/or audio data based on a trigger event, such as a request from processor 310 to perform additional processing. Alternatively or additionally, an assessment of the audio and/or image data may be performed periodically to determine whether earphone case 130 is in a functional state for generating processed audio signals.

Based a determination that at least one function of earphone case 130 is unavailable (i.e., that earphone case is in a non-functional state for generating the processed audio signal), earphone 110 may cause a notification to use earphone case 130 to be presented to user 100. The notification may be presented to user 100 in various ways. For example, this may include presenting vocal instructions, a chime, a tone, an alert, or various other audible notifications to an ear of user 100 via hearing interface 350. In some embodiments, an audible notification may be presented from another device, such as computing device 120. As another example, the notification may be a visual indicator. For example, a notification may be presented on a display of computing device 120 or another visual indicator component within system 200. Accordingly, causing the notification to be presented may include transmitting a signal to another device of system 200 to cause the device to present the notification. As another example, the notification may be in the form of a tactile notification, such as a vibration, which may be presented by earphone 110, computing device 120, earphone case 130 (e.g., via feedback outputting units 380, 440, or 1280), or any other device within system 200.

Figure 15:
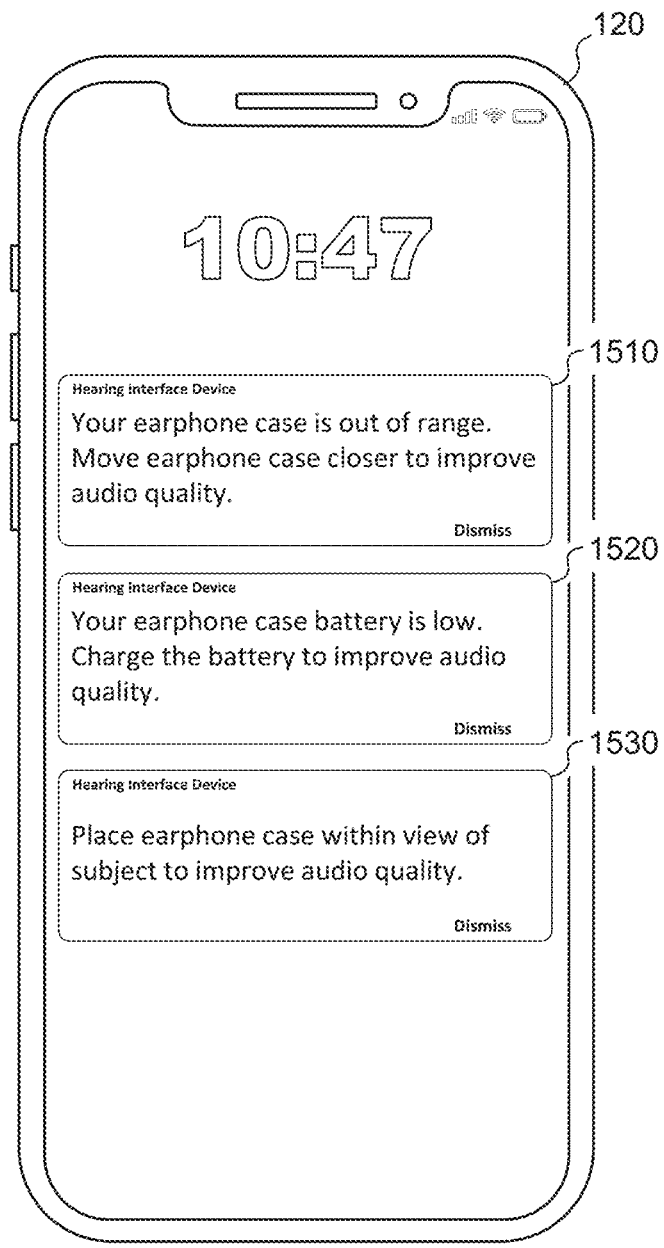
FIG. 15 illustrates example notifications that may be presented to a user, consistent with the disclosed embodiments.

In some embodiments, the notification may provide instructions to user 100 to take at least one action associated with earphone case 130. In some embodiments, the notification may indicate a specific issue that was detected, such as a particular function being unavailable or impeded in some way, a signal strength or battery level being low, or any other assessed characteristics described above. FIG. 15 illustrates example notifications that may be presented to user 100 via computing device 120, consistent with the disclosed embodiments. For example, a notification 1510 may be presented indicating that earphone case 130 is out of range. Referring to FIG. 14, earphone case 130 may be in position 1410 or in any other location where a signal strength between earphone 110 and earphone case 130 may be weak or nonexistent. Accordingly, notification 1510 may include instructions for user 100 to move earphone case 130 closer to earphone 110. As another example, a notification 1520 may be presented indicating that a battery level of earphone case 130 (e.g., a level of power source 1270) is low or depleted. Accordingly, notification 1520 may include instructions to charge power source 1270. As a further example, a notification 1530 may indicate that a subject is not within view of a camera of earphone case 130. For example, processor 1210 may analyze an image captured using image sensor 1230 and may determine that individual 1420 is not represented (or represented clearly or fully) within the image. Accordingly, notification 1530 may further instruct user 100 to position earphone case such that the subject is within the field of view. Notifications 1510, 1520, and 1530 are provided by way of example, and various other forms of notifications may be presented, which may be based on a state of earphone case 130. While notifications 1510, 1520, and 1530 are shown as visual notifications, it is to be understood that these notifications may equally be presented in other forms, such as an audible message presented in the ear of user 100, a vibration, or the like. Additionally or alternatively, one or more notifications may be provided upon identification of a volume, clarity or another characteristic of a captured audio signal which indicates that additional capabilities or processing associated with earphone case 130 are required, and that it may be beneficial to make earphone case 130 available.

Based on the notification, user 100 may take at least one action associated with earphone case 130. In some embodiments, this may include moving earphone case 130 to a location to facilitate generation of a processed audio signal. For example, based on one of notifications 1510, 1520, and/or 1530, user 100 may move earphone case from one of positions 1410 or 1412 to position 1414. Accordingly, earphone case 130 may be within range of earphone 110 and individual 1420 may be within the field of view 1406 of image sensor 1230, as shown in FIG. 14. As another example, user 100 may plug in earphone case (i.e., connect power interface 1276 to a power source), which may provide sufficient power to perform processing tasks by processor 1210. Based on the action taken by user 100, processor 310 may cause earphone case 130 to generate the processed audio signal, as described above.

According to some embodiments, the notification may be presented based on a determination that additional processing by processor 1210 is needed or may be advantageous. For example, processor 310 may identify at least one condition of environment 140 indicating that processing by earphone case 130 is required for generating a processed audio signal. In some embodiments, this may include analyzing image data and/or audio signals to identify the condition. As one example, the condition may be based on a noise level in the environment. For example, the noise level may be determined based on a captured audio signal. Based on a comparison of the noise level to a predefined threshold (e.g., a threshold noise level), processor 310 may determine that additional processing from processor 1210 would be helpful or needed. As another example, the condition may be based on a classification of the environment. In some embodiments, the classification may be a characterization of a type of an environment, such as "restaurant," "meeting," "home," "vehicle," or various other classifications, which may have different processing requirements. As another example, the classification may be based on a noise level, such as "loud," "moderate," "quiet," etc. The classification may be based on other properties, such as a number of individuals in the environment, a number of speaking individuals, or the like.

The classification may be determined in various ways. In some embodiments, the classification may be based on analysis of images and/or audio signals captured by earphone 110. For example, this may include application of an image analysis algorithm to detect and classify objects represented in one or more images. Based on the types of objects detected, earphone 110 may determine or estimate a type of environment. For example, based on a detection of chairs, tables, plates of food, or other objects in environment 1400, processor 310 may classify environment 1400 as a restaurant. As another example, the classification may be based on application of a trained machine learning model. For example, a training set of image data may be input into a machine learning model, which may be labeled to include various classifications. Accordingly, a model may be trained to predict or determine classifications based on captured images. Alternatively or additionally, a model may be trained to predict or determine classifications based on captured audio. For example, the clanging of dishes and cutlery, background music, voices of many individuals, and other sounds may indicate a user is in a restaurant. Sounds such as a television, voices of a few individuals, a vacuum cleaner, of other sounds may indicate the user is at home. Similar to the model described above, a training set of audio data may be input into a machine learning model, which may be labeled to include various classifications. As a result, audio data captured using earphone 110 (and/or earphone case 130 may be input into the trained model, which may be trained to predict or determine classifications based on the captured audio. Consistent with the present disclosure, various types training or machine learning algorithms may be used, including a logistic regression, a linear regression, a regression, a random forest, a K-Nearest Neighbor (KNN)

model, a K-Means model, a decision tree, a cox proportional hazards regression model, a Naïve Bayes model, a Support Vector Machines (SVM) model, a gradient boosting algorithm, or any other form of machine learning model or algorithm.

Figure 16:
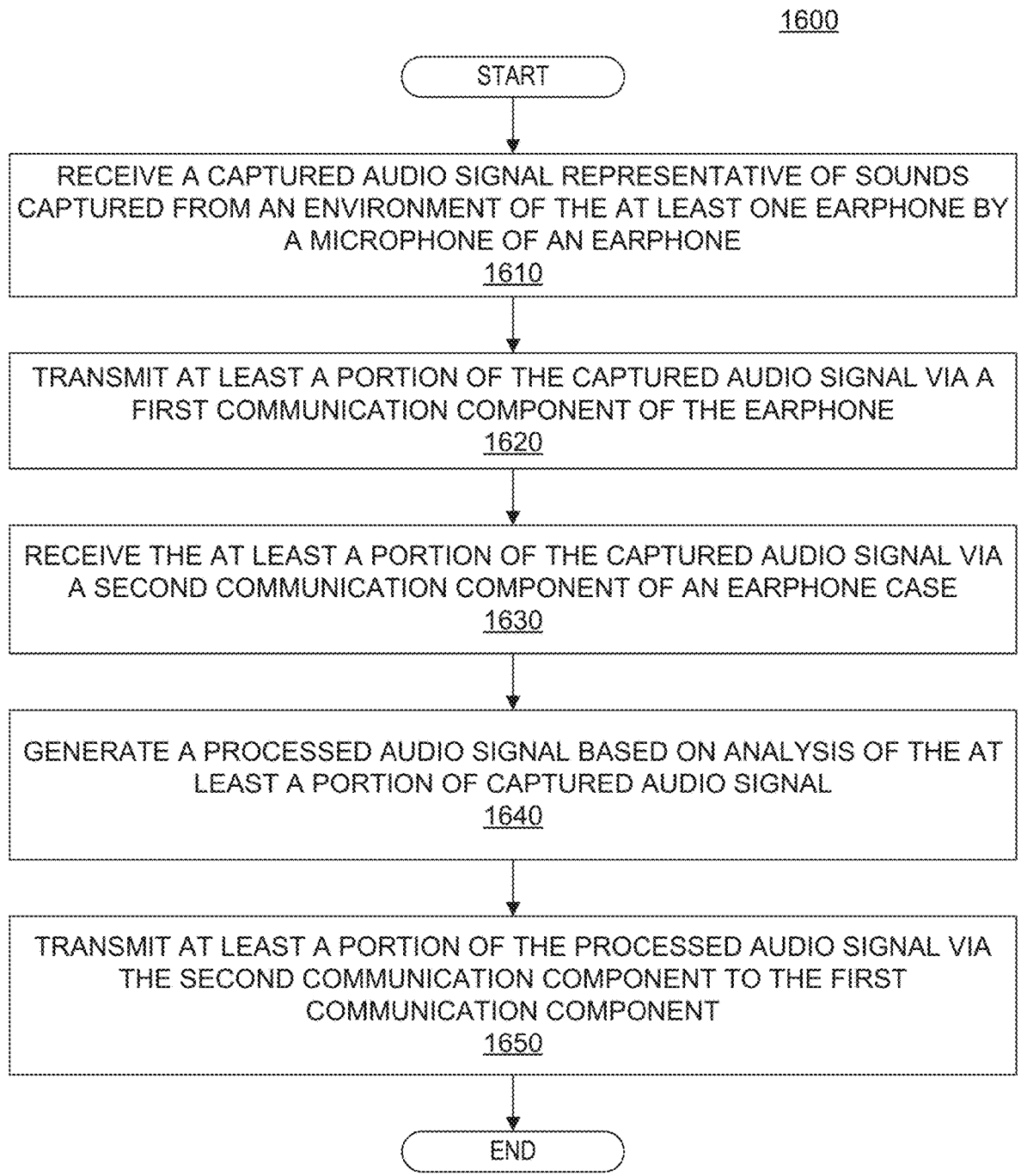
FIG. 16 is a flowchart showing an example process for generating processed audio signals, consistent with the disclosed embodiments.

FIG. 16 is a flowchart showing an example process 1600 for generating processed audio signals, consistent with the disclosed embodiments. Process 1600 may be performed by at least one processing device of an earphone, such as processor 310, and at least one processing device of an earphone case, such as processor 1210. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1600. Further, process 1600 is not necessarily limited to the steps shown in FIG. 16, and any steps or processes of the various embodiments described throughout the present disclosure may also be included in process 1600, including those described above with respect to FIGS. 12, 13A, 13B, 14, and 15.

In step 1610, process 1600 may include receiving a captured audio signal representative of sounds captured from an environment of at least one earphone. For example, the audio signal may include representations of sounds 1422 and 1432 from environment 1400 as described above. In some embodiments, the captured audio signal may be captured by at least one microphone of the at least one earphone. For example, step 1610 may include receiving an audio signal captured using audio sensor 310. Accordingly, step 1610 may be performed using at least one first processor of the at least one earphone, such as processor 310 described above.

In step 1620, process 1600 may include transmitting, using the at least one first processor, at least a portion of the captured audio signal via a first communication component of the at least one earphone. For example, step 1610 may include transmitting at least a portion of the captured audio signal via wireless transceiver 360 to earphone case 130 for additional processing, as described above. In some embodiments, the first communication component may be configured to communicate with various other devices of system 200. For example, the at least one earphone may comprise a first earphone (e.g., earphone 110) and a second earphone (e.g., earphone 710) and the first communication component of the first earphone may be configured to communicate with the first communication component of the second earphone.

In some embodiments, the at least a portion of the captured audio signal may be transmitted based on a determination that additional processing is required, which may be based on an analysis of the captured audio signal. Accordingly, process 1600 may include generating an additional processed audio signal based on analysis of the at least a portion of captured audio signal using the first processor and determining, based on at least one aspect of the additional processed audio signal, whether to initiate additional processing. For example, the at least one aspect of the additional processed audio signal may include a signal-to-noise ratio of the additional processed audio signal or a volume level associated with at least one audio source represented in the captured audio signal, as described above. Step 1620 may include transmitting the at least a portion of the captured audio signal via the first communication component based on a determination to initiate additional processing.

In step 1630, process 1600 may include receiving the at least a portion of the captured audio signal from the first communication component via a second communication component of the earphone case. For example, the at least a portion of the captured audio signal may be received using wireless transceiver 1260 of earphone case 130, as described above. Accordingly, step 1630 may be performed using at least one second processor of earphone case, such as processor 1210. The earphone case may include any of the various components described herein. For example, the earphone case may include at least one earphone compartment configured to receive the at least one earphone, such as compartments 1202 and 1204 described above. In some embodiments, the earphone case may further comprise a charging circuit for charging the at least one earphone when inserted into the at least one earphone compartment. For example, the charging circuit may include one or more of power interfaces 1272 and 1274 and power source 1270.

In step 1640, process 1600 may include generating, using the at least one second processor, a processed audio signal based on analysis of the at least a portion of captured audio signal. The processed audio signal may be generated in various ways, including the various forms of selective conditioning described herein. In some embodiments, generating the processed audio signal includes amplifying a voice of an individual represented in the captured audio signal relative to at least one additional sound. For example, this may include amplifying sound 1422 (which may include a voice of individual 1420) relative to sound 1432. In some embodiments, the voice of the individual may be amplified based on an input from the user. For example, the input may include a selection of a representation of the individual via a graphical user interface, such as graphical user interface 1000 described above.

According to some embodiments, the earphone case may include sensors for acquiring additional data used to generate the processed audio signal. For example, the earphone case may further comprise at least one additional microphone for capturing an additional audio signal. The additional microphone may correspond to audio sensor 1240 described above. The processed audio signal may further be generated based on analysis of at least a portion of the additional audio signal. In some embodiments, generating the processed audio signal may include determining a direction of at least one audio source represented in the captured audio signal based on the analysis of the at least a portion of the additional audio signal. For example, the at least one additional microphone comprises a microphone array, which may indicate a direction from which sounds are received relative to earphone case 130.

As another example, the earphone case may further comprise at least one camera configured to capture a plurality of images from an environment of the earphone case. For example, the at least one camera may correspond to image sensor 1230, as described above. The processed audio signal may further be generated based on analysis of at least one image of the plurality of images. For example, generating the processed audio signal may include amplifying a voice of an individual represented in the captured audio signal relative to at least one additional sound, as described above. In some embodiments, amplifying the voice of the individual may include identifying the individual based on the at least one image. For example, this may include recognizing individual 1420, which may be based on facial features or other characteristics of individual 1420.

In some embodiments, generating the processed audio signal may include application of a trained machine learning algorithm using the at least one second processor. For example, memory 1220 may include a machine learning model or algorithm trained to selectively condition the captured audio signal as described herein. For example, a training set of audio and/or image data may be input into a machine learning model, along with corresponding processed audio signals, which may be selectively conditioned to amplify a voice of one audio source relative to other sources. Accordingly, a model may be trained upon the training data to generate processed audio signals. In some embodiments the trained machine learning model may be trained to perform specific tasks, such as recognizing an individual based on facial features, voiceprints, etc., separating audio, enhancing audio, or various other tasks described herein. Consistent with the present disclosure, various training or machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, or any other form of machine learning model or algorithm.

In step 1650, process 1600 may include transmitting, using the at least one second processor, at least a portion of the processed audio signal via the second communication component to the first communication component. For example, this may include transmitting the processed audio signal from wireless transceiver 1260 to wireless transceiver 160, as described above. In some embodiments, process 1600 may further include presenting, using the at least one first processor, the at least a portion of the processed audio signal to an ear of a user of the at least one earphone. For example, this may include presenting the processed audio signal to an ear of user 100 using hearing interface component 350.

In some embodiments, earphone 110 may be configured to determine whether additional processing from the earphone case is needed or desirable (i.e., is expected to improve a quality of processing the captured audio signal, etc.). Accordingly, process 1600 may further include identifying at least one condition of the environment of the at least one earphone. For example, the at least one condition may be based on a comparison of a noise level of the captured audio signal to a predetermined threshold, a classification of the environment of the at least one earphone, or various other forms of conditioning. Based on the at least one condition, process 1600 may include identifying that the earphone case is required for generating the processed audio signal; and causing a notification to use the earphone case to be presented to a user of the at least one earphone. The notification may be presented in various ways. For example, causing the notification to be presented may include transmitting a signal to at least one device associated with the at least one earphone; or providing at least one of a visual, auditory, or tactile signal to the user via the at least one earphone or by a paired device, as described above.

In some embodiments, the notification to use the earphone case may be caused to be presented based on whether the earphone case is in a functional state for generating the processed audio signal. For example, the notification may be presented to the user based on at least one of a signal strength of a signal received from the second communication component or a power level associated with the earphone case. Process 1600 may further include determining whether the earphone case has been restored to a functional state for generating the processed audio signal. For example, process 1600 may further include identifying that the user has placed the earphone case in location facilitating generation of the processed audio signal by the earphone case and causing the earphone case to generate the processed audio signal. In some embodiments, the earphone case may remind the user to use the earphone case if the functional state is not restored. For example, process 1600 may further include providing an additional notification to the user after a predetermined time has elapsed since providing the notification.

Figure 17:
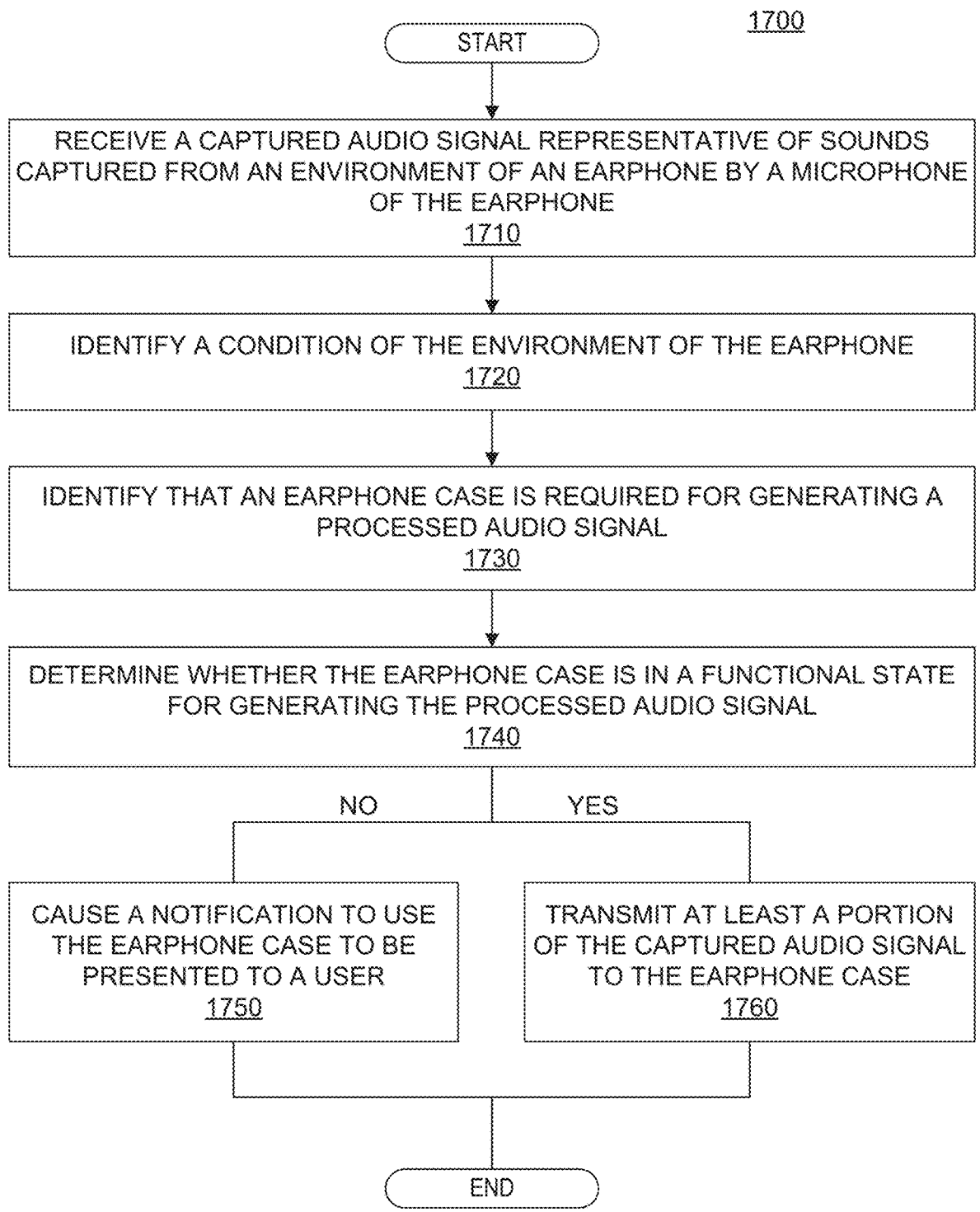
FIG. 17 is a flowchart showing another example process for generating processed audio signals, consistent with the disclosed embodiments.

FIG. 17 is a flowchart showing another example process 1700 for generating processed audio signals, consistent with the disclosed embodiments. Process 1700 may be performed by at least one processing device of an earphone, such as processor 310. In some embodiments, a non-transitory computer readable medium may contain instructions that when executed by a processor cause the processor to perform process 1700. Further, process 1700 is not necessarily limited to the steps shown in FIG. 17, and any steps or processes of the various embodiments described throughout the present disclosure may also be included in process 1700, including those described above with respect to FIGS. 12, 13A, 13B, 14, 15, and 16.

In step 1710, process 1700 may include receiving a captured audio signal representative of sounds captured from an environment of the at least one earphone by at least one microphone of the at least one earphone. For example, the audio signal may include representations of sounds 1422 and 1432 from environment 1400 as described above. In some embodiments, the captured audio signal may be captured by at least one microphone of the at least one earphone. For example, step 1610 may include receiving an audio signal captured using audio sensor 310.

In step 1720, process 1700 may include identifying at least one condition of the environment of the at least one earphone. Various types of conditions may be identified in step 1720. As one example, the condition may be based on a noise level or a signal to noise ratio in the environment. As another example, the condition may be based on a classification of the environment, as described herein.

In step 1730, process 1700 may include identifying that the earphone case is required for generating a processed audio signal based on the at least one condition. For example, this may include determining that the noise or the signal to noise level exceeds a threshold level, as described herein. As another example, this may include determining that the classification of the environment warrants additional processing by the earphone case.

In step 1740, process 1700 may include determining whether the earphone case is in a functional state for generating the processed audio signal. A functional state may refer to a state in which some or all of the processing capabilities of earphone case are functional to generate a processed audio signal. In some embodiments, the functional state may be based on a state of earphone case 130. For example, this may include a power level of earphone case 130, a status or mode of earphone case 130, a signal strength of earphone case 130 (e.g., indicating whether earphone case 130 is within range of earphone 110), or the like. In some embodiments, the functional state may be based on specific functionality or features of earphone case 130. For example, the functional state may be determined based on analysis of an image or audio data captured using earphone case 130, as described above, which may indicate whether data captured image sensor 1230 or audio sensor 1240 would provide additional information that may be used to improve processing of the captured audio signal.

As indicated in step 1750, based on a determination that the earphone case is not in the functional state, process 1700 may include causing a notification to use the earphone case to be presented to a user of the at least one earphone. The notification may be presented in various ways. For example, causing the notification to be presented may include transmitting a signal to at least one device associated with the at least one earphone; or providing at least one of a visual, auditory, or tactile signal to the user via the at least one earphone, as described above.

As indicated in step 1760, based on a determination that the earphone is in the functional state, process 1700 may include transmitting at least a portion of the captured audio signal via the at least one first communication component to at least one second communication component of an earphone case. For example, step 1760 may include transmitting at least a portion of the captured audio signal via wireless transceiver 360 to earphone case 130 for additional processing. Accordingly, the earphone case may be configured to receive the at least a portion of the captured audio signal from the first communication component via a second communication component of the earphone case; generate a processed audio signal based on analysis of the at least a portion of captured audio signal; and transmit at least a portion of the processed audio signal via the second communication component to the first communication component, as described above.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for generating processed audio signals, the system comprising:
   one or more earphones, at least one earphone of the one or more earphones comprising:
      at least one microphone configured to capture sounds from an environment of the at least one earphone;
      a first communication component; and
      at least one first processor programmed to:
         receive a captured audio signal representative of the sounds captured by the at least one microphone; and
         transmit at least a portion of the captured audio signal via the first communication component; and
   an earphone case comprising:
      at least one earphone compartment configured to receive the at least one earphone;
      a second communication component; and
      at least one second processor programmed to:
         receive the at least a portion of the captured audio signal from the first communication component via the second communication component;
         generate a processed audio signal based on analysis of the at least a portion of captured audio signal; and
         transmit at least a portion of the processed audio signal via the second communication component to the first communication component.

2. The hearing interface system of claim 1, wherein the earphone case further comprises at least one additional microphone for capturing an additional audio signal, and wherein the processed audio signal is further generated based on analysis of at least a portion of the additional audio signal.

3. The hearing interface system of claim 2, wherein the at least one additional microphone comprises a microphone array.

4. The hearing interface system of claim 2, wherein generating the processed audio signal includes determining a direction of at least one audio source represented in the captured audio signal based on the analysis of the at least a portion of the additional audio signal.

5. The hearing interface system of claim 1, wherein the earphone case further comprises a charging circuit for charging the at least one earphone when inserted into the at least one earphone compartment.

6. The hearing interface system of claim 1, wherein generating the processed audio signal includes amplifying a voice of an individual represented in the captured audio signal relative to at least one additional sound.

7. The hearing interface system of claim 6, wherein the voice of the individual is amplified based on an input from the user, the input including a selection of a representation of the voice of the individual via a graphical user interface.

8. The hearing interface system of claim 1, wherein generating the processed audio signal includes application of a trained machine learning algorithm using the at least one second processor.

9. The hearing interface system of claim 1, wherein the earphone case further comprises at least one camera configured to capture a plurality of images from an environment of the earphone case, and wherein the processed audio signal is further generated based on analysis of at least one image of the plurality of images.

10. The hearing interface system of claim 9, wherein generating the processed audio signal includes amplifying a voice of an individual represented in the captured audio signal relative to at least one additional sound, and wherein amplifying the voice of the individual includes identifying the individual based on the at least one image.

11. The hearing interface system of claim 1, wherein the at least one first processor is further programmed to generate an additional processed audio signal based on analysis of the at least a portion of captured audio signal.

12. The hearing interface system of claim 11, wherein the at least one first processor is further programmed to:
  determine, based on at least one aspect of the additional processed audio signal, whether to initiate additional processing; and
  transmit the at least a portion of the captured audio signal via the first communication component based on a determination to initiate additional processing.

13. The hearing interface system of claim 12, wherein the at least one aspect of the additional processed audio signal includes a signal-to-noise ratio of the additional processed audio signal or a volume level associated with at least one audio source represented in the captured audio signal.

14. The hearing interface system of claim 1, wherein the at least one first processor is further programmed to present the at least a portion of the processed audio signal to an ear of a user of the at least one earphone.

15. The hearing interface system of claim 1, wherein the at least one first processor is further programmed to:
  identify at least one condition of the environment of the at least one earphone;
  based on the at least one condition, identify that the earphone case is required for generating the processed audio signal; and
  cause a notification to use the earphone case to be presented to a user of the at least one earphone, wherein the notification is presented to the user based on at least one of a signal strength of a signal received from the second communication component or a power level associated with the earphone case.

16. The hearing interface system of claim 15, wherein the at least one first processor is further programmed to:
  identify that the user has placed the earphone case in location facilitating generation of the processed audio signal by the earphone case; and
  cause the earphone case to generate the processed audio signal.

17. The hearing interface system of claim 15, wherein the at least one condition is based on at least one of a comparison of a noise level of the captured audio signal to a predetermined threshold or a classification of the environment of the at least one earphone.

18. The hearing interface system of claim 15, wherein the earphone case further comprises at least one additional microphone for capturing an additional audio signal, and wherein the earphone case is further configured to generate the processed audio signal based on analysis of at least a portion of the additional audio signal.

19. The hearing interface system of claim 15, wherein causing the notification to be presented comprises at least one of:
  transmitting a signal to at least one device associated with the at least one earphone; or
  providing at least one of a visual, auditory, or tactile signal to the user via the at least one earphone.

20. A method for generating processed audio signals using a system, the system including one or more earphones and an earphone case, the method comprising:
  receiving, using at least one first processor of the at least one earphone, a captured audio signal representative of sounds captured from an environment of the at least one earphone by at least one microphone of the at least one earphone;
  transmitting, using the at least one first processor, at least a portion of the captured audio signal via a first communication component of the at least one earphone;
  receiving, using at least one second processor of the earphone case, the at least a portion of the captured audio signal from the first communication component via a second communication component of the earphone case;
  generating, using the at least one second processor, a processed audio signal based on analysis of the at least a portion of captured audio signal; and
  transmitting, using the at least one second processor, at least a portion of the processed audio signal via the second communication component to the first communication component.

21. A system for generating processed audio signals, the system comprising:
  one or more earphones and an earphone case, at least one earphone of the one or more earphones comprising:
    at least one microphone configured to capture sounds from an environment of the at least one earphone;
    at least one first communication component; and
    at least one first processor programmed to:
      receive a captured audio signal representative of the sounds captured by the at least one microphone;
      identify at least one condition of the environment of the at least one earphone;
      based on the at least one condition, identify that the earphone case is required for generating a processed audio signal;
      determine whether the earphone case is in a functional state for generating the processed audio signal;
      based on a determination that the earphone case is not in the functional state, causing a notification to use the earphone case to be presented to a user of the at least one earphone; and
      based on a determination that the earphone case is in the functional state, transmit at least a portion of the captured audio signal via the at least one first communication component; and
  the earphone case comprising:
    at least one earphone compartment configured to receive the at least one earphone;
    at least one second communication component; and
    at least one second processor programmed to:
      receive the at least a portion of the captured audio signal from the first communication component via the second communication component;
      generate a processed audio signal based on analysis of the at least a portion of captured audio signal; and
      transmit at least a portion of the processed audio signal via the second communication component to the first communication component.

22. A method for generating processed audio signals using a system, the system including at least one earphone and an earphone case, the method comprising:

receiving a captured audio signal representative of sounds captured from an environment of the at least one earphone by at least one microphone of the at least one earphone;

identifying at least one condition of the environment of the at least one earphone;

based on the at least one condition, identify that the earphone case is required for generating a processed audio signal;

determining whether the earphone case is in a functional state for generating the processed audio signal;

based on a determination that the earphone case is not in the functional state, causing a notification to use the earphone case to be presented to a user of the at least one earphone; and based on a determination that the earphone is in the functional state, transmitting at least a portion of the captured audio signal via the at least one first communication component to at least one second communication component of an earphone case, the earphone case being configured to:

receive the at least a portion of the captured audio signal from the first communication component via a second communication component of the earphone case;

generate a processed audio signal based on analysis of the at least a portion of captured audio signal; and transmit at least a portion of the processed audio signal via the second communication component to the first communication component.

* * * * *